US010602137B2

(12) United States Patent
Lee et al.

(10) Patent No.: US 10,602,137 B2
(45) Date of Patent: *Mar. 24, 2020

(54) METHOD AND DEVICE FOR ENCODING/DECODING MULTI-LAYER VIDEO SIGNAL

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/025,323

(22) Filed: Jul. 2, 2018

(65) Prior Publication Data
US 2018/0309985 A1    Oct. 25, 2018

Related U.S. Application Data

(63) Continuation of application No. 15/214,708, filed on Jul. 20, 2016, now Pat. No. 10,051,267, which is a
(Continued)

(30) Foreign Application Priority Data

Oct. 22, 2013   (KR) ........................ 10-2013-0125922

(51) Int. Cl.
*H04N 19/33*     (2014.01)
*H04N 19/105*    (2014.01)
(Continued)

(52) U.S. Cl.
CPC ......... *H04N 19/105* (2014.11); *H04N 19/117* (2014.11); *H04N 19/124* (2014.11);
(Continued)

(58) Field of Classification Search
CPC .. H04N 19/105; H04N 19/172; H04N 19/187; H04N 19/33; H04N 19/31;
(Continued)

(56) References Cited

U.S. PATENT DOCUMENTS 9,467,707 B2 * 10/2016 Rapaka ................ H04N 19/17
9,473,779 B2 * 10/2016 Rapaka ................ H04N 19/17
(Continued)

FOREIGN PATENT DOCUMENTS

CN       101401430 A     4/2009
CN       105191311 A    12/2015
(Continued)

OTHER PUBLICATIONS

Karsten Suhring et al., "Indication of tile boundary alignment", Document: JCTVC-M0202, Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013.
(Continued)

*Primary Examiner* — Tung T Vo
(74) *Attorney, Agent, or Firm* — IP Legal Services, LLC

(57) ABSTRACT

A method for decoding a multi-layer video signal, according to the present invention, determines whether a corresponding picture in a lower layer is used as an inter-layer reference picture for a current picture in an upper layer, on the basis of a time level identifier of the lower layer, and restrictively performs inter-layer prediction for the current picture on the basis of a tile boundary alignment flag indicating whether tile alignment is performed between the upper layer and the lower layer if the corresponding picture in the lower layer is used as the inter-layer reference picture for the current picture in the upper layer.

4 Claims, 14 Drawing Sheets

Related U.S. Application Data continuation of application No. 15/029,310, filed as application No. PCT/KR2014/009880 on Oct. 21, 2014, now Pat. No. 10,045,019.

(51) Int. Cl.

| | | |
|---|---|---|
| *H04N 19/70* | (2014.01) | |
| *H04N 19/117* | (2014.01) | |
| *H04N 19/172* | (2014.01) | |
| *H04N 19/187* | (2014.01) | |
| *H04N 19/31* | (2014.01) | |
| *H04N 19/159* | (2014.01) | |
| *H04N 19/61* | (2014.01) | |
| *H04N 19/124* | (2014.01) | |
| *H04N 19/513* | (2014.01) | |
| *H04N 19/436* | (2014.01) | |

(52) U.S. Cl.
CPC ......... *H04N 19/159* (2014.11); *H04N 19/172* (2014.11); *H04N 19/187* (2014.11); *H04N 19/31* (2014.11); *H04N 19/33* (2014.11); *H04N 19/513* (2014.11); *H04N 19/61* (2014.11); *H04N 19/70* (2014.11); *H04N 19/436* (2014.11)

(58) Field of Classification Search
CPC .... H04N 19/513; H04N 19/117; H04N 19/61; H04N 19/159; H04N 19/124; H04N 19/70; H04N 19/436
USPC .......................... 375/240.12, 240.13, 240.16
See application file for complete search history.

(56) References Cited

U.S. PATENT DOCUMENTS

| | | | |
|---|---|---|---|
| 2006/0262985 A1 | 11/2006 | Chen et al. | |
| 2007/0201551 A1* | 8/2007 | Wang ................... | H04N 19/105 375/240.1 |
| 2008/0123742 A1 | 5/2008 | Xu et al. | |
| 2009/0010331 A1 | 1/2009 | Jeon et al. | |
| 2009/0010332 A1 | 1/2009 | Jeon et al. | |
| 2009/0034626 A1 | 2/2009 | Park et al. | |
| 2009/0060040 A1 | 3/2009 | Jeon et al. | |
| 2009/0220010 A1 | 9/2009 | Park et al. | |
| 2009/0310680 A1 | 12/2009 | Jeon et al. | |
| 2010/0158116 A1 | 6/2010 | Jeon et al. | |
| 2010/0316139 A1* | 12/2010 | Le Leannec ......... | H04N 19/159 375/240.29 |
| 2012/0219060 A1 | 8/2012 | Chen et al. | |
| 2013/0155184 A1 | 6/2013 | Chen et al. | |
| 2013/0163670 A1 | 6/2013 | Cherif et al. | |
| 2014/0037015 A1* | 2/2014 | Ye ........................ | H04N 19/46 375/240.26 |
| 2014/0079119 A1 | 3/2014 | Samuelsson et al. | |
| 2014/0119440 A1 | 5/2014 | Lee et al. | |
| 2014/0119441 A1 | 5/2014 | Lee et al. | |
| 2014/0133567 A1* | 5/2014 | Rusanovskyy ...... | H04N 19/597 375/240.16 |
| 2014/0146875 A1* | 5/2014 | Chong ............. | H04N 19/00066 375/240.02 |
| 2014/0218473 A1* | 8/2014 | Hannuksela ......... | H04N 19/597 348/43 |
| 2014/0254666 A1 | 9/2014 | Rapaka et al. | |
| 2014/0254667 A1 | 9/2014 | Rapaka et al. | |
| 2014/0254668 A1* | 9/2014 | Rapaka ................. | H04N 19/50 375/240.12 |
| 2014/0254669 A1* | 9/2014 | Rapaka ................. | H04N 19/50 375/240.12 |
| 2014/0301463 A1* | 10/2014 | Rusanovskyy ....... | H04N 19/52 375/240.14 |
| 2015/0016540 A1* | 1/2015 | Rapaka ................ | H04N 19/136 375/240.24 |
| 2015/0071356 A1* | 3/2015 | Kim ..................... | H04N 19/513 375/240.16 |
| 2015/0078446 A1 | 3/2015 | Jun et al. | |
| 2015/0103920 A1* | 4/2015 | Rapaka ................. | H04N 19/70 375/240.26 |
| 2015/0103927 A1 | 4/2015 | Hannuksela | |
| 2015/0139325 A1* | 5/2015 | Chuang ................ | H04N 19/51 375/240.16 |
| 2015/0208092 A1* | 7/2015 | Lee ...................... | H04N 19/105 375/240.12 |
| 2015/0373315 A1 | 12/2015 | Chen et al. | |
| 2016/0044309 A1 | 2/2016 | Choi et al. | |
| 2016/0080753 A1* | 3/2016 | Oh ........................ | H04N 19/70 375/240.14 |
| 2016/0150236 A1* | 5/2016 | Maeda ................. | H04N 19/90 375/240.08 |
| 2016/0165247 A1* | 6/2016 | Deshpande .......... | H04N 19/597 375/240.08 |
| 2016/0191926 A1* | 6/2016 | Deshpande .......... | H04N 19/597 375/240.12 |
| 2016/0261881 A1 | 9/2016 | Deshpande | |
| 2019/0014337 A1* | 1/2019 | Skupin ................. | H04N 19/34 |

FOREIGN PATENT DOCUMENTS

| | | |
|---|---|---|
| CN | 105359525 A | 2/2016 |
| KR | 10-2008-0015830 A | 2/2008 |
| KR | 10-2013-0000334 A | 1/2013 |
| KR | 10-2013-0107861 A | 10/2013 |
| WO | 2012/173439 A2 | 12/2012 |
| WO | 2013/062470 A1 | 5/2013 |

OTHER PUBLICATIONS

Byeongdoo Choi et al., "Temporal layer management for HEVC extension", Document: JCTVC-M0170, Joint Collaborative Team on Video Coding (JCT-VC) of ITU-T SG 16 WP 3 and ISO/IEC JTC 1/SC 29/WG 11, 13th Meeting: Incheon, KR Apr. 18-26, 2013.

Jianle Chen et al., "High efficiency video coding (HEVC) scalable extension Draft 3", Document: JCTVC-N1008_v2, Joint Collaborative Team on Video Coding (JCT-VC) of ITU-T SG 16 WP 3 and ISO/IEC JTC 1/SC 291WG 11, 14th Meeting: Vienna, AT, Jul. 24-Aug. 2, 2013.

Karsten Suehring et al., "Tile boundary alignment and inter-layer prediction constraints for SHVC and MVHEVC", JCTVC-M0464, Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013.

\* cited by examiner

| vps_extension( ) { | Descriptor |
|---|---|
| ... | |
| for( i = 1; i<=vps_max_layers_minus1; i++ ){ | |
| // layer dependency | |
| for( j = 0; j<i; j++) | |
| direct_dependency_flag[i][j] | u(1) |
| } | |
| for( i = 0; i<=vps_max_layers_minus1; i++ ){ | |
| max_tid_il_ref_plus1[i] | u(3) |
| } | |
| } | |

S500

FIG. 6
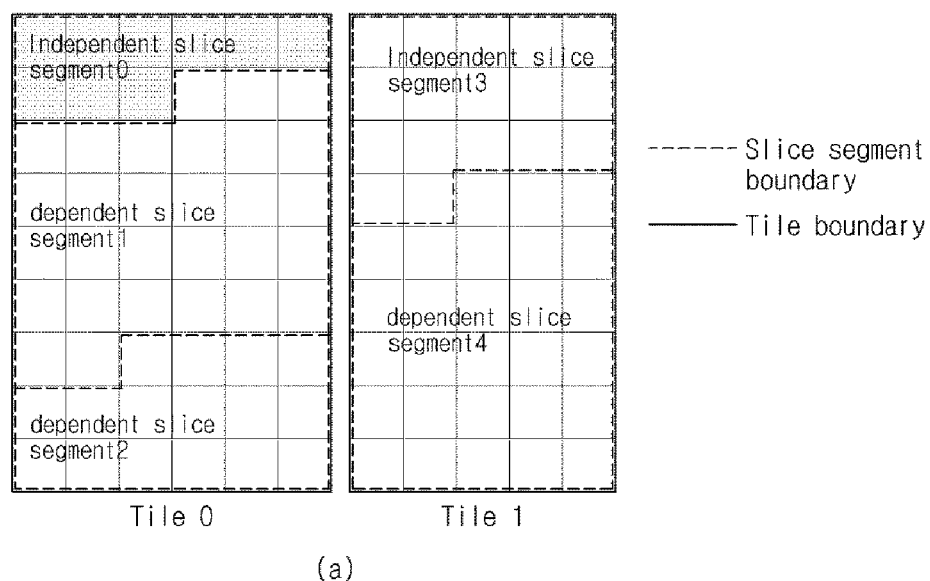
(a)
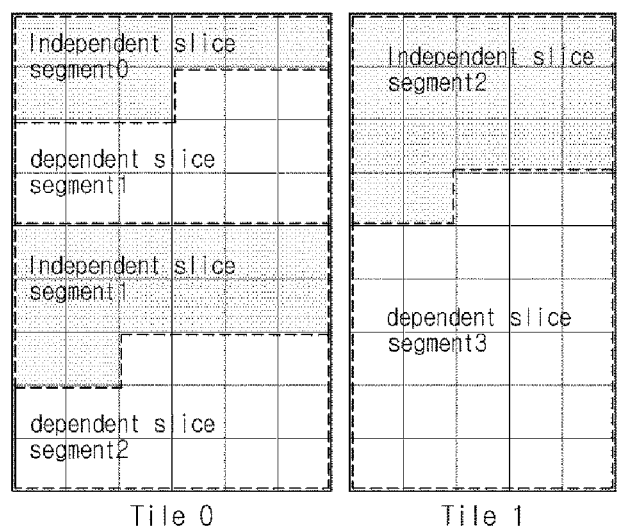
(b)

FIG. 13

| | Descriptor |
|---|---|
| vps_vui( ){ | |
| ... | |
| for( i = 1; i <= vps_max_layers_minus1; i++ ) | |
|   for( j = 0; j < NumDirectRefLayers[layer_id_in_nuh[i]]; j++ ){ | |
|     tile_boundaries_aligned_flag[i][j] | u(1) |
|   } | |
| ... | |
| } | |

| | Descriptor |
|---|---|
| vps_vui( ){ | |
| ... | |
| tile_boundaries_non_aligned_flag | u(1) |
| if(!tile_boundaries_non_aligned_flag){ | |
|   for( i = 1; i <= vps_max_layers_minus1; i++ ) | |
|     for( j = 0; j < NumDirectRefLayers[layer_id_in_nuh[i]]; j++ ){ | |
|       tile_boundaries_aligned_flag[i][j] | u(1) |
|     } | |
| ... | |
| } | |

| | Descriptor |
|---|---|
| vps_vui( ){ | |
| ... | |
| tile_boundaries_aligned_present_flag | u(1) |
| if(tile_boundaries_aligned_present_flag){ | |
| for( i = 1; i <= vps_max_layers_minus1; i++ ) | |
| for( j = 0; j < NumDirectRefLayers[layer_id_in_nuh[i]]; j++ ){ | |
| tile_boundaries_aligned_flag[i][j] | u(1) |
| } | |
| ... | |
| } | |

S1500 — tile_boundaries_aligned_present_flag
S1510 — tile_boundaries_aligned_flag[i][j]

METHOD AND DEVICE FOR ENCODING/DECODING MULTI-LAYER VIDEO SIGNAL

CROSS REFERENCE TO RELATED APPLICATIONS

This application is a Continuation of U.S. patent application Ser. No. 15/214,708 (filed on Jul. 20, 2016), which is a Continuation of U.S. patent application Ser. No. 15/029,310 (filed on Apr. 14, 2016), which is a National Stage Patent Application of PCT International Patent Application No. PCT/KR2014/009880 (filed on Oct. 21, 2014) under 35 U.S.C. § 371, which claims priority to Korean Patent Application No. 10-2013-0125922 (filed on Oct. 22, 2013), the teachings of which are incorporated herein in their entireties by reference.

TECHNICAL FIELD

The present invention relates to a method and apparatus for encoding/decoding a multi-layer video signal.

BACKGROUND ART

Demands for high-resolution, high-quality images such as High Definition (HD) images and Ultra High Definition (UHD) images have recently increased in various fields of applications. As video data has a higher resolution and higher quality, the video data is larger in amount than traditional video data. Therefore, if video data is transmitted on an existing medium such as a wired/wireless wideband circuit or stored in an existing storage medium, transmission cost and storage cost increase. To avert these problems encountered with higher-resolution, higher-quality video data, high-efficiency video compression techniques may be used.

There are a variety of video compression techniques including inter-picture prediction in which pixel values included in a current picture are predicted from a picture previous to or following the current picture, intra-picture prediction in which pixel values included in a current picture are predicted using pixel information in the current picture, and entropy encoding in which a short code is assigned to a more frequent value and a long code is assigned to a less frequent value. Video data may be compressed effectively and transmitted or stored, using such a video compression technique.

Along with the increasing demands for high-resolution videos, demands for three-dimensional (3D) video content as a new video service have been increasing. A video compression technique for effectively providing HD and UHD 3D video content is under discussion.

DISCLOSURE

Technical Problem

An object of the present invention is to provide a method and apparatus for determining an inter-layer reference picture for a current picture of an upper layer in encoding/decoding a multi-layer video signal.

Another object of the present invention is to provide a method and apparatus for up-sampling a picture of a lower layer in encoding/decoding a multi-layer video signal.

Another object of the present invention is to provide a method and apparatus for effectively inducing texture information of an upper layer through inter-layer prediction in encoding/decoding a multi-layer video signal.

Another object of the present invention is to provide a method and apparatus for performing inter-layer prediction based on inter-layer tile alignment in encoding/decoding a multi-layer video signal.

Technical Solution

In a method and apparatus for decoding a multi-layer video signal according to the present invention, it may be determined whether a corresponding picture of a lower layer is used in inter-layer prediction of a current picture of an upper layer, based on a temporal level identifier (ID) of the lower layer, and if the corresponding picture of the lower layer is used in inter-layer prediction of the current picture of the upper layer, inter-layer prediction of the current picture may be performed using the corresponding picture.

In the method and apparatus for decoding a multi-layer video signal according to the present invention, the inter-layer prediction may be performed restrictively depending on a tile boundary alignment flag indicating whether tiles between the upper layer and the lower layer are aligned.

In the method and apparatus for decoding a multi-layer video signal according to the present invention, if the tile boundary alignment flag has a value of 1, when two samples of the current picture belonging to the upper layer belong to one tile, two samples of the corresponding picture belonging to the lower layer may belong to one tile, and when the two samples of the current picture belonging to the upper layer belong to different tiles from each other, the two samples of the corresponding picture belonging to the lower layer may belong to different tiles from each other.

In the method and apparatus for decoding a multi-layer video signal according to the present invention, if the tile boundary alignment flag is 1, a sample outside the tile belonging to the corresponding picture is not used for the inter-layer prediction of a sample inside the tile belonging to the current picture.

In the method and apparatus for decoding a multi-layer video signal according to the present invention, the tile boundary alignment flag may be acquired restrictively based on the number of a tile belonging to the current picture.

In a method and apparatus for encoding a multi-layer video signal according to the present invention, it may be determined whether a corresponding picture of a lower layer is used in inter-layer prediction of a current picture of an upper layer, based on a temporal level ID of the lower layer, and if the corresponding picture of the lower layer is used in inter-layer prediction of the current picture of the upper layer, inter-layer prediction of the current picture may be performed using the corresponding picture.

In the method and apparatus for encoding a multi-layer video signal according to the present invention, the inter-layer prediction may be performed restrictively depending on a tile boundary alignment flag indicating whether tiles between the upper layer and the lower layer are aligned.

In the method and apparatus for encoding a multi-layer video signal according to the present invention, if the tile boundary alignment flag has a value of 1, when two samples of the current picture belonging to the upper layer belong to one tile, two samples of the corresponding picture belonging to the lower layer may belong to one tile, and when the two samples of the current picture belonging to the upper layer belong to different tiles from each other, the two samples of the corresponding picture belonging to the lower layer may belong to different tiles from each other.

In method and apparatus for encoding a multi-layer video signal according to the present invention, if the tile boundary alignment flag has a value of 1, a sample outside the tile belonging to the corresponding picture is not used for the inter-layer prediction of a sample inside the tile belonging to the current picture.

In the method and apparatus for encoding a multi-layer video signal according to the present invention, the tile boundary alignment flag may be acquired restrictively based on the number of a tile belonging to the current picture.

Advantageous Effects

According to the present invention, a memory can be managed effectively by adaptively using a lower-layer picture as an inter-layer reference picture for a current upper-layer picture.

According to the present invention, a lower-layer picture can be up-sampled effectively.

According to the present invention, texture information of an upper layer can be induced effectively through inter-layer prediction.

According to the present invention, the coding efficiency of a video signal can be increased by restrictively performing inter-layer prediction based on inter-layer tile alignment in a multi-layer structure.

BRIEF DESCRIPTION OF THE DRAWINGS

FIG. 6 illustrates a relationship between slices and tiles in an embodiment to which the present invention is applied.

FIGS. 13, 14, and 15 illustrate syntaxes of a tile boundary alignment flag in an embodiment to which the present invention is applied.

BEST MODE FOR CARRYING OUT THE INVENTION

Figure 1:
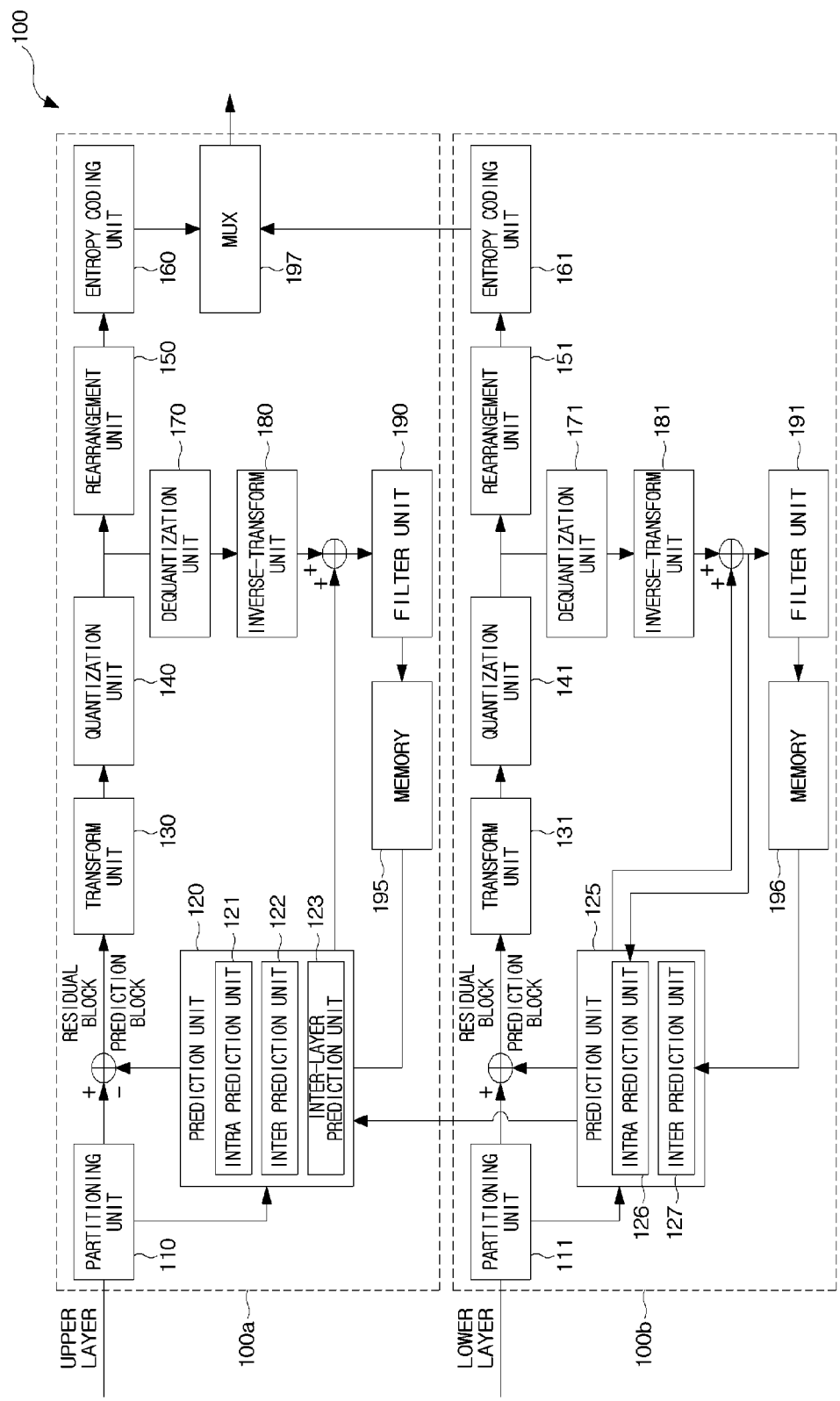
FIG. 1 is a block diagram illustrating an encoding apparatus according to an embodiment of the present invention.

A method and apparatus for decoding a multi-layer video signal according to the present invention are characterized in that it is determined whether a corresponding picture of a lower layer is used in inter-layer prediction of a current picture of an upper layer, based on a temporal level identifier (ID) of the lower layer, and if the corresponding picture of the lower layer is used in inter-layer prediction of the current picture of the upper layer, inter-layer prediction of the current picture is performed using the corresponding picture.

The method and apparatus for decoding a multi-layer video signal according to the present invention are characterized in that the inter-layer prediction is performed restrictively depending on a tile boundary alignment flag indicating whether tiles between the upper layer and the lower layer are aligned.

The method and apparatus for decoding a multi-layer video signal according to the present invention are characterized in that, if the tile boundary alignment flag has a value of 1, when two samples of the current picture belonging to the upper layer belong to one tile, two samples of the corresponding picture belonging to the lower layer belong to one tile, and when the two samples of the current picture belonging to the upper layer belong to different tiles from each other, the two samples of the corresponding picture belonging to the lower layer belong to different tiles from each other.

The method and apparatus for decoding a multi-layer video signal according to the present invention are characterized in that if the tile boundary alignment flag is 1, a sample outside the tile belonging to the corresponding picture is not used for the inter-layer prediction of a sample inside the tile belonging to the current picture.

The method and apparatus for decoding a multi-layer video signal according to the present invention are characterized in that the tile boundary alignment flag is acquired restrictively based on the number of a tile belonging to the current picture.

A method and apparatus for encoding a multi-layer video signal according to the present invention are characterized in that it is determined whether a corresponding picture of a lower layer is used in inter-layer prediction of a current picture of an upper layer, based on a temporal level ID of the lower layer, and if the corresponding picture of the lower layer is used in inter-layer prediction of the current picture of the upper layer, inter-layer prediction of the current picture is performed using the corresponding picture.

The method and apparatus for encoding a multi-layer video signal according to the present invention are characterized in that the inter-layer prediction is performed restrictively depending on a tile boundary alignment flag indicating whether tiles between the upper layer and the lower layer are aligned.

The method and apparatus for encoding a multi-layer video signal according to the present invention are characterized in that, if the tile boundary alignment flag has a value of 1, when two samples of the current picture belonging to the upper layer belong to one tile, two samples of the corresponding picture belonging to the lower layer belong to one tile, and when the two samples of the current picture belonging to the upper layer belong to different tiles from each other, the two samples of the corresponding picture belonging to the lower layer belong to different tiles from each other.

The method and apparatus for encoding a multi-layer video signal according to the present invention are characterized in that if the tile boundary alignment flag has a value of 1, a sample outside the tile belonging to the corresponding picture is not used for the inter-layer prediction of a sample inside the tile belonging to the current picture.

The method and apparatus for encoding a multi-layer video signal according to the present invention are characterized in that the tile boundary alignment flag is acquired restrictively based on the number of a tile belonging to the current picture.

Mode for Carrying Out the Invention

Preferred embodiments of the present invention will be described below in detail with reference to the attached drawings. Before the detailed description, it is to be understood that terms or words as used in the present disclosure and the claims should be interpreted not as their general or dictionary meanings but as meanings and concepts matching the scope and spirit of the present invention based on the principle that the inventor can define the concepts of terms appropriately in the best manner. Therefore, the embodiments as described below and configurations shown in the drawings are merely preferred embodiments of the present invention, not representing all of the technical subject matter of the present invention. Accordingly, it is to be understood that they can be replaced with various equivalents and modification examples at the time of filing the present invention.

When it is said that a component is "coupled with/to" or "connected to" another component, it should be understood that the one component is coupled or connected to the other component directly or through any other component in between. In the present disclosure, the term "include" does not exclude the presence of any other component than a specific component, meaning that an additional component may be included in an embodiment of the present invention or the scope of the present invention.

The term as used in the present disclosure, first or second may be used to describe various components, not limiting the components. These expressions are used to distinguish one component from another component. For example, a first component may be referred to as a second component and vice versa without departing the scope of the present disclosure.

Also, components in embodiments of the present invention are shown as independent to illustrate different characteristic functions, not meaning that each component is configured in a separate hardware unit or one software unit. That is, each component is enumerated separately, for the convenience of description. Thus, two or more components may be incorporated into one component or one component may be divided into a plurality of components. An embodiment of integrating components and an embodiment of dividing a component fall into the scope of the present invention.

Some components may be optional to increase performance, not essential to main functions of the present invention. The present invention may be implemented only with components essential to the subject matter of the present invention, without components used just to increase performance, which falls within the scope of the present invention.

Video encoding and decoding that supports multiple layers of a bit stream is called scalable video coding. Because there is a strong correlation between the multiple layers, redundant components of data may be eliminated and video coding performance may be increased, by performing prediction based on the correlation. Prediction of a current layer using information about another layer is referred to as inter-layer prediction.

The multiple layers may have different resolutions. The resolutions may mean at least one of spatial resolution, temporal resolution, and image quality. To control resolution during inter-layer prediction, a layer may be subjected to re-sampling such as up-sampling or down-sampling.

FIG. 1 is a block diagram schematically illustrating an encoding device according to an embodiment of the present invention.

An encoding device 100 according to the present invention includes an encoding unit 100a for an upper layer and an encoding unit 100b for a lower layer.

The upper layer may be called a current layer or an enhancement layer, and the lower layer may be called an enhancement layer having resolution lower than that of the upper layer, a base layer or a reference layer. At least one of the spatial resolution, temporal resolution based on a frame rate, color format, and image quality based on a quantization step size may differ between the upper layer and the lower layer. When a change of resolution is required for inter-layer prediction, up-sampling or down-sampling of the layer may be performed.

The encoding unit 100a for the upper layer may include a partitioning unit 110, a prediction unit 120, a transform unit 130, a quantization unit 140, a rearrangement unit 150, an entropy coding unit 160, an inverse quantization unit 170, an inverse-transform unit 180, a filter unit 190, and memory 195.

The encoding unit 100b for the lower layer may include a partitioning unit 111, a prediction unit 125, a transform unit 131, a quantization unit 141, a rearrangement unit 151, an entropy coding unit 161, an inverse quantization unit 171, an inverse-transform unit 181, a filter unit 191, and memory 196.

The encoding unit may be implemented by a video encoding method described in an embodiment of the present invention, which will be described below, but the operations of some parts may not be performed in order to reduce the complexity of the encoding device or to enable fast real-time encoding. For example, rather than a method in which all intra-prediction mode methods are used to select the optimal intra-encoding method, a method in which one is selected from among a limited number of intra-prediction modes and the selected one is set as the final intra-prediction mode may be performed for real-time encoding when the prediction unit performs intra-prediction. In another example, a prediction block used for intra-prediction or inter-prediction may have a limited shape.

The unit of a block processed in the encoding device may be a coding unit for performing coding, a prediction unit for performing prediction, or a transform unit for performing transformation. The coding unit, the prediction unit, and the transform unit may be represented as CU, PU, and TU, respectively.

Each of the partitioning units 110 and 111 may partition a layer by partitioning a layer picture into multiple combinations of coding blocks, prediction blocks, and transform blocks, and by selecting one combination of coding blocks, prediction blocks, and transform blocks based on a predetermined reference (for example, a cost function). For example, in order to partition a layer picture into coding units, a recursive tree structure such as a QuadTree structure may be used. Hereinafter, in an embodiment of the present invention, a coding block may mean not only a block for encoding but also a block for decoding.

A prediction block may be a unit for performing prediction, such as intra-prediction or inter-prediction. A block for intra-prediction may be a block having the form of a square, such as 2N×2N or N×N. As a block for inter-prediction, there are a block in the form of a square, such as 2N×2N and N×N, a block in the form of a rectangle, such as 2N×N and N×2N, and a block having an asymmetric form, obtained by a prediction block partitioning method using Asymmetric Motion Partitioning (AMP). The transform unit 115 may use different transform methods depending on the form of the prediction block.

Each of the prediction units 120 and 125 of the encoding units 100a and 100b may include an intra-prediction unit 121 or 126 for performing intra-prediction and an inter-prediction unit 122 or 127 for performing inter-prediction. The prediction unit 120 of the encoding unit 100a for the upper layer may further include an inter-layer prediction unit 123, which performs prediction of the upper layer using the information relating to the lower layer.

Each of the prediction units 120 and 125 may determine whether to perform inter-prediction or intra-prediction of a prediction block. When intra-prediction is performed, an intra-prediction mode is determined based on a prediction block, and a process for processing intra-prediction based on the determined intra-prediction mode may be performed based on a transform block. A residual (residual block) between the generated prediction block and the original block may be input to the transform units 130 and 131. Also, the prediction mode information used for prediction, motion information, and the like are encoded along with the residual by the entropy coding unit 130, and may be transmitted to the decoding device.

When a Pulse Code Modulation (PCM) mode is used, the original block may be encoded unchanged without performing prediction using the prediction units 120 and 125, and may be transmitted to a decoding unit.

Each of the intra-prediction units 121 and 126 may generate an intra-predicted block based on reference pixels located around the current block (the prediction target block). In the intra-prediction method, the intra-prediction mode may have a directional prediction mode, which uses reference pixels according to the prediction direction, and a non-directional mode, which does not consider a prediction direction. The mode for predicting luma information may be different from the mode for predicting chroma information. Intra-prediction mode, obtained by predicting luma information, or the predicted luma information may be used to predict chroma information. Meanwhile, if the reference pixels are not available, a prediction block may be generated by replacing the unavailable reference pixels with other pixels.

A prediction block may include multiple transform blocks. If the size of a prediction block is the same as the size of a transform block when performing intra-prediction, intra-prediction of the prediction block may be performed based on a left pixel, an upper-left pixel, and an upper pixel of the prediction block. However, as the time of intra-prediction, when the sizes of the prediction block and the transform block are different and multiple transform blocks are included inside the prediction block, neighboring pixels adjacent to the transform blocks are used as reference pixels to perform the intra-prediction. Here, the neighboring pixels adjacent to the transform block may include at least one of neighboring pixels adjacent to the prediction block and previously decoded pixels in the prediction blocks.

However, if the size of a prediction block is different from that of a transform block when performing intra-prediction and thus the prediction block includes multiple transform blocks, intra-prediction may be performed based on reference pixels determined based on the transform block.

The intra-prediction method may generate a prediction block after applying a Mode-Dependent Intra Smoothing (MDIS) filter to reference pixels according to the intra-prediction mode. The type of MDIS filter applied to the reference pixels may vary. The MDIS filter is an additional filter applied to an intra-predicted block generated by performing intra-prediction, and may be used for reducing a residual between reference pixels and the intra-predicted block, generated after performing prediction. When MDIS filtering is performed, different filtering may be performed on reference pixels and on some columns included in the intra-predicted block according to the direction of the intra-prediction mode.

Each of the inter-prediction units 122 and 127 may perform prediction by referring to the information about a block included in at least one of the picture preceding and the picture following the current picture. Each of the inter-prediction units 122 and 127 may include a reference picture interpolation unit, a motion prediction unit, and a motion compensation unit.

The reference picture interpolation unit may receive reference picture information from memory 195 or 196 and may generate information about a pixel, which is smaller than an integer pixel, from the reference picture. For a luma pixel, a DCT-based 8-tap interpolation filter, which differently sets filter coefficients to generate information about a pixel that is smaller than an integer pixel in units of ¼ pixels, may be used. For chroma signals, a DCT-based 4-tap interpolation filter, which differently sets filter coefficients to generate information about a pixel that is smaller than an integer pixel in units of ⅛ pixels, may be used.

Each of the inter-prediction units 122 and 127 may perform motion prediction based on the reference picture interpolated by the reference picture interpolation unit. As a method for calculating a motion vector, various methods, such as a Full search-based Block Matching Algorithm (FBMA), a Three-Step Search (TSS) algorithm, and a New Three-Step Search (NTS) Algorithm, may be used. The motion vector may have a motion vector value corresponding to ½ or ¼ of the interpolated pixel. Each of the inter-prediction units 122 and 127 may perform prediction on a current block using any one of various inter-prediction methods.

As the inter-prediction method, any of various methods such as a skip method, a merge method, and a Motion Vector Prediction (MVP) method may be used.

In inter-prediction, motion information, that is, information about a reference index, a motion vector, and a residual signal, is entropy-coded and then transferred to the decoding unit. When a skip mode is applied, a residual signal is not generated, and thus a procedure for transforming and quantizing a residual signal may be omitted.

The inter-layer prediction unit 123 performs inter-layer prediction for predicting an upper layer using information about the lower layer. The inter-layer prediction unit 123 may perform inter-layer prediction using the texture information, motion information, etc. of the lower layer.

The inter-layer prediction may be performed by setting the picture of the lower layer as a reference picture and performing prediction on the current block of the upper layer using the motion information in the picture of the lower layer (reference layer). The picture of the reference layer, used as a reference picture in the inter-layer prediction, may be a picture that is sampled so as to match the resolution of the current layer. Also, the motion information may include a motion vector and a reference index. In this case, the motion vector value for the picture of the reference layer may be set to (0, 0).

As an example of the inter-layer prediction, a prediction method that uses the picture of a lower layer as a reference picture is described, but the present invention is not limited to this. The inter-layer prediction unit 123 may additionally perform inter-layer texture prediction, inter-layer motion prediction, inter-layer syntax prediction, inter-layer residual prediction, and the like.

The inter-layer texture prediction may derive the texture of the current layer based on the texture of the reference layer. The texture of the reference layer may be sampled to match the resolution of the current layer, and the inter-layer prediction unit 123 may predict the texture of the current layer based on the sampled texture of the reference layer.

The inter-layer motion prediction may derive the motion vector of the current layer based on the motion vector of the reference layer. In this case, the motion vector of the reference layer may be scaled to match the resolution of the current layer. The inter-layer syntax prediction may predict the syntax of the current layer based on the syntax of the reference layer. For example, the inter-layer prediction unit 123 may use the syntax of the reference layer as the syntax of the current layer. Also, the inter-layer residual prediction may reconstruct the picture of the current layer using the residual between the restored picture of the reference layer and the restored picture of the current layer.

A residual block including residual information, which is the difference between the prediction block generated by each of the prediction units 120 and 125 and the reconstructed block of the prediction block, is generated, and the residual block is input to the corresponding transform unit 130 or 131.

Each of the transform units 130 and 131 may transform the residual block using a transform method such as a Discrete Cosine Transform (DCT) or Discrete Sine Transform (DST). Whether to apply DCT or DST to transform the residual block may be determined based on the intra-prediction mode information of the prediction block used to generate the residual block and the size information of the prediction block. That is, each of the transform units 130 and 131 may use different transform methods depending on the size of the prediction block and the prediction method.

Each of the quantization units 140 and 141 may quantize values transformed in the frequency domain by the corresponding transform unit 130 or 131. The quantization coefficients may change depending on the type of block or the importance of the pictures. The value calculated by the quantization unit 140 or 141 may be provided to the inverse-quantization unit 170 or 17 and the rearrangement unit 150 or 151.

Each of the rearrangement units 150 and 151 may rearrange coefficient values of the quantized residual value. The rearrangement unit 150 or 151 may change a 2D block format coefficient to a 1D vector format coefficient using a coefficient scanning method. For example, the rearrangement unit 150 or 151 may change the 2D block format coefficient to a 1D vector format coefficient by scanning coefficients ranging from a DC coefficient to a high-frequency band coefficient using a zigzag scanning method. Depending on the size of the transform block and on the intra-prediction mode, a vertical scanning method for scanning 2D block format coefficients in a column direction and a horizontal scanning method for scanning 2D block format coefficients in a row direction, rather than the zigzag scanning method, may be used. That is, the determination of which one of the zigzag scanning, vertical scanning, and horizontal scanning methods is to be used may be made depending on the size of the transform block and the intra-prediction mode.

Each of the entropy coding units 160 and 161 may perform entropy coding based on the values calculated by the rearrangement unit 150 or 151. The entropy coding may be implemented using, for example, various coding methods such as Exponential Golomb, Context-Adaptive Variable Length Coding (CAVLC), and Context-Adaptive Binary Arithmetic Coding (CABAC).

The entropy coding units 160 and 161 may perform entropy coding based on a predetermined coding method by receiving various information, such as residual coefficient information and block type information of a coding block, prediction mode information, partition unit information, prediction block information and transmission unit information, motion vector information, reference frame information, interpolation information for a block, filtering information, and the like, from the rearrangement units 150 and 151 and the prediction units 120 and 125. Also, the entropy coding units 160 and 161 may entropy-code the coefficient value of a coding unit, input from the rearrangement units 150 and 151.

Each of the entropy coding units 160 and 161 may encode the intra-prediction mode information of the current block by binary-coding the intra-prediction mode information. The entropy coding units 160 and 161 may include a codeword mapping unit for the binary coding, and may perform the binary coding differently depending on the size of the prediction block for intra-prediction. The codeword mapping unit may adaptively generate a codeword mapping table through a binary coding operation, or may have a previously generated mapping table. In another embodiment, the entropy coding units 160 and 161 may represent the intra-prediction mode information about the current block using a code-num mapping unit for performing code-num mapping and a codeword mapping unit for performing codeword mapping. The code-num mapping unit and the codeword mapping unit may generate a code-num mapping table and a codeword mapping table, respectively, or may respectively have a previously generated code-num mapping table and codeword mapping table.

Each of the inverse quantization units 170 and 171 and the inverse transform unit 180 or 181 may inverse-quantize the values quantized by the quantization unit 140 or 141 and inverse-transform the values transformed by the transform unit 130 or 131. The residual value generated by the inverse quantization unit 170 or 171 and the inverse transform unit 180 or 181 may be combined with the prediction block predicted by the motion estimation unit, the motion compensation unit, and the intra-prediction unit, which are included in the prediction unit 120 or 125, and thus a reconstructed block may be generated.

Each of the filter units 190 and 191 may include at least one of a deblocking filter and an offset correction unit.

The deblocking filter may remove block distortion, generated due to the boundaries between blocks, in the reconstructed picture. Whether to perform deblocking, namely, whether to apply the deblocking filter to the current block, may be determined based on the pixels included in some rows or columns of the block. When the deblocking filter is applied to a block, a strong filter or a weak filter may be applied according to the required strength of deblocking filtering. Also, in applying the deblocking filter, when vertical filtering and horizontal filtering are performed, the vertical filtering and the horizontal filtering may be processed in parallel.

The offset correction unit may correct an offset between the picture on which deblocking is performed and the original picture in pixel units. In order to perform the offset correction on a specific picture, a method in which the pixels included in the picture are divided into certain areas, the area to which an offset is to be applied is determined, and the offset is applied to the area may be used, or a method in which the offset is applied in consideration of the information about the edge of each pixel may be used.

Each of the filter units 190 and 191 may be implemented using only a deblocking filter, or using both a deblocking filter and offset correction, rather than using all of a deblocking filter and offset correction.

Each of the memory 195 and 196 may store the reconstructed block or pictures calculated by the filter unit 190 or 191, and the reconstructed block and pictures stored in the memory may be provided to the prediction unit 120 or 125 when intra-prediction is performed.

Information output from the entropy coding unit 100b of the lower layer and information output from the entropy coding unit 100a of the upper layer are multiplexed by the MUX 197, and may then be output in the form of a bitstream.

The MUX 197 may be included in the encoding unit 100a of the upper layer or the encoding unit 100b of the lower layer, or may be implemented as a separate device or module, unlike the encoding unit 100.

Figure 2:
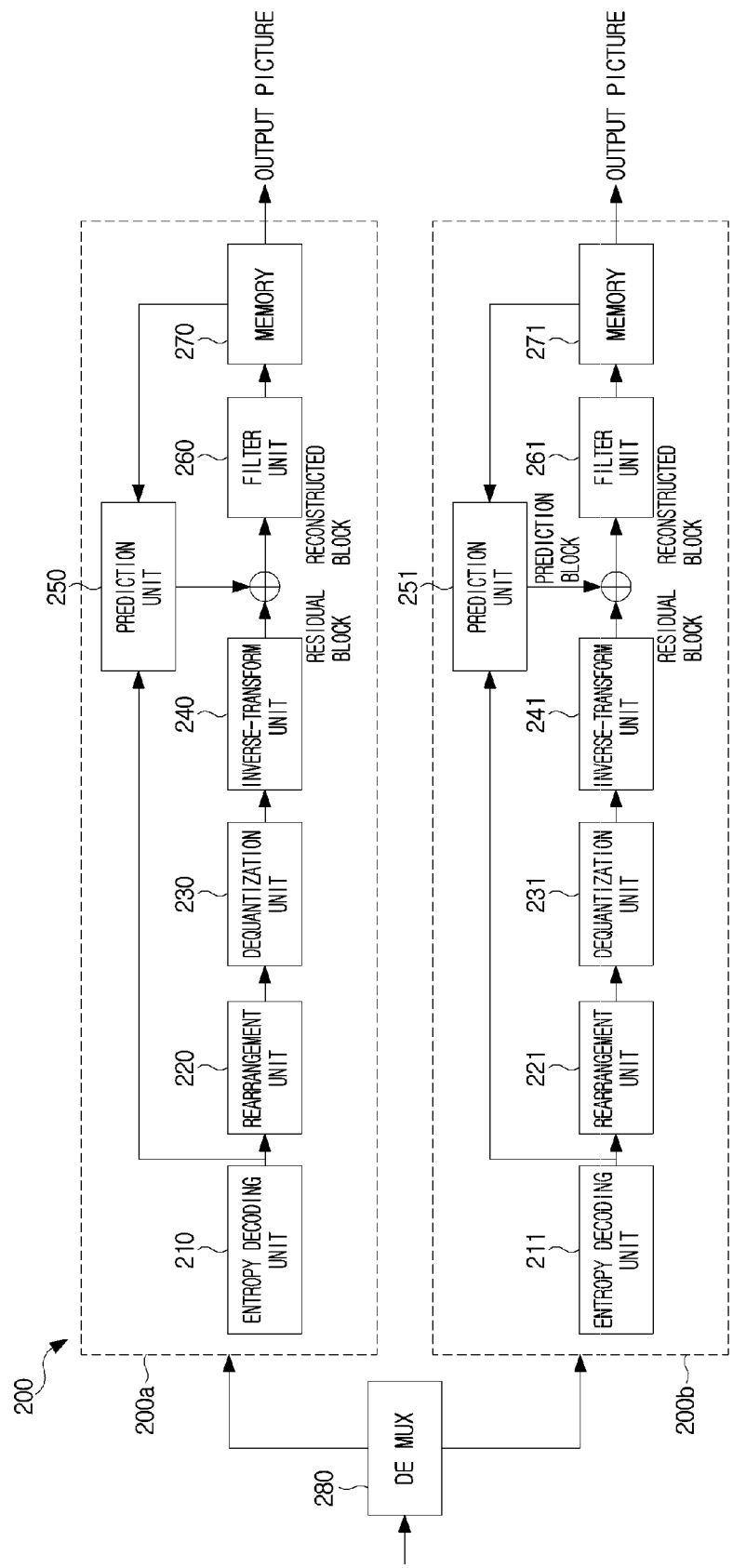
FIG. 2 is a block diagram illustrating a decoding apparatus according to an embodiment of the present invention.

FIG. 2 is a block diagram schematically showing a decoding device according to an embodiment of the present invention.

As shown in FIG. 2, a decoding device 200 includes a decoding unit 200a of an upper layer and a decoding unit 200b of a lower layer.

The decoding unit 200a of the upper layer may include an entropy decoding unit 210, a rearrangement unit 220, an inverse-quantization unit 230, an inverse-transform unit 245, a prediction unit 250, a filter unit 260, and memory 270.

The decoding unit 200b of the lower layer may include an entropy decoding unit 211, a rearrangement unit 221, an inverse-quantization unit 231, an inverse-transform unit 241, a prediction unit 251, a filter unit 261, and memory 271.

When a bitstream including multiple layers is transmitted from the encoding device, a demultiplexer (DEMUX) 280 demultiplexes the information corresponding to each of the layers and transmits the result to the decoding unit 200a or 200b of each of the layers. The input bitstream may be decoded through a process that is the reverse of the process of the encoding device.

Each of the entropy decoding units 210 and 211 may perform entropy-decoding through the reverse of the entropy-coding process performed by the entropy coding unit of the encoding device. Among the pieces of information decoded by the entropy decoding units 210 and 211, information required to generate a prediction block is provided to the prediction units 250 and 251, and a residual, entropy-decoded by the entropy decoding unit, may be input to the rearrangement units 220 and 221.

Each of the entropy decoding units 210 and 211 may use at least one of CABAC and CAVLC, like the entropy coding units 160 and 161.

Each of the entropy decoding units 210 and 211 may decode information about intra-prediction and inter-prediction performed by the encoding device. Each of the entropy decoding units 210 and 211 includes a codeword mapping unit that has a codeword mapping table for generating an intra-prediction mode number from a received codeword. The codeword mapping table may be stored in advance, or may be generated adaptively. When a codeNum mapping table is used, a codeNum mapping unit for performing codeNum mapping may be additionally arranged.

Each of the rearrangement units 220 and 221 may rearrange the bitstream, entropy-decoded by the entropy decoding unit 210 or 211, based on the arrangement method used by the encoding unit. The coefficients, represented in one-dimensional vector form, may be rearranged as 2-dimensional block-type coefficients by being reconstructed. Each of the rearrangement units 220 and 221 receives the information about the coefficient scanning method performed by the encoding unit, and may rearrange the coefficients using a method in which inverse scanning is performed based on the sequence of scanning performed by the encoding unit.

Each of the inverse-quantization units 230 and 231 may perform inverse quantization based on the quantization parameter provided by the encoding device and the rearranged coefficients of the block.

Each of the inverse-transform units 240 and 241 may perform inverse DCT or inverse DST, which correspond to DCT and DST performed by the corresponding transform unit 130 or 131, on the result of quantization performed by the encoding device. The inverse-transform may be performed in transmission units determined by the encoding device. In the transform unit of the encoding device, DCT and DST may be selectively performed according to multiple pieces of information, such as the prediction method, the size of the current block, the prediction direction, and the like. The inverse-transform unit 240 or 241 of the decoding device may perform inverse transform based on the information about the transform performed by the transform unit of the encoding device. Transform may be performed based on a coding block rather than a transform block.

Each of the prediction units 250 and 251 may generate a prediction block based on information about the generation of the prediction block, provided by the entropy decoding units 210 and 211, and information about previously decoded blocks or pictures, provided from the corresponding memory 270 or 271.

Each of the prediction units 250 and 251 may include a prediction unit determination unit, an inter-prediction unit, and an intra-prediction unit.

The prediction unit determination unit receives various information, including prediction unit information input from the entropy decoding unit, prediction mode information about an intra-prediction method, motion prediction information about an inter-prediction method, and the like, separates a prediction block from a current coding block, and determines whether the prediction block performs intra-prediction or inter-prediction.

The inter-prediction unit may perform inter-prediction of the current prediction block based on information included in at least one of the picture preceding and the picture following the current picture, which includes the current prediction block, using information required for inter-prediction of the current prediction block provided by the encoding device. In order to perform inter-prediction, it may be determined whether the method used as the motion prediction method of the prediction block included in the coding block based on the corresponding coding block is a skip mode, a merge mode, or a mode (AMVP mode) using a Motion vector Predictor (MVP).

The intra-prediction unit may generate a prediction block based on information about reconstructed pixels in the current picture. When the prediction block is a prediction block on which intra-prediction is performed, intra-prediction may be performed based on the intra-prediction mode information about the prediction block, provided by the encoding device. The intra-prediction unit may include an MDIS filter for performing filtering on reference pixels of the current block, a reference pixel interpolation unit for generating reference pixels in units smaller than a single pixel by interpolating the reference pixels, and a DC filter for generating a prediction block through filtering when the prediction mode of the current block is a DC mode.

The prediction unit 250 of the decoding unit 200a of the upper layer may further include an inter-layer prediction unit for performing inter-layer prediction, in which the upper layer is predicted using information about the lower layer.

The inter-layer prediction unit may perform inter-layer prediction by using intra-prediction mode information, motion information, etc.

The inter-layer prediction is implemented such that prediction of a current block of the upper layer is performed by adopting a lower layer picture as a reference picture and using motion information relating to the picture of the lower layer (reference layer).

In the inter-layer prediction, a picture of the reference layer, which is used as a reference picture, may be sampled suitably for the resolution of a current layer. In addition, the motion information may include the motion vector and reference index. At this point, a motion vector value for the reference layer picture may be set to (0, 0).

As an example of the inter-layer prediction, a prediction method for using the lower layer picture as a reference picture is described, but is not limited thereto. The inter-layer prediction unit 123 may additionally perform an inter-layer texture prediction, an inter-layer motion prediction, an inter-layer syntax prediction, and an inter-layer residual prediction, etc.

The inter-layer texture prediction may derive texture of a current layer based on texture of the reference layer. The reference layer texture may be sampled suitably for the resolution of the current layer, and the inter-layer prediction unit may predict the current layer texture based on the sampled texture. The inter-layer motion prediction may derive a motion vector of the current layer based on the motion vector of the reference layer. Here, the motion vector of the reference layer may be scaled suitably for the resolution of the current layer. In the inter-layer syntax prediction, current layer syntax may be predicted based on the reference layer syntax. For example, the inter-layer prediction unit 123 may use the reference layer syntax as current layer syntax. In addition, in the inter-layer residual prediction, the picture of the current layer may be reconstructed by using a difference between a reconstructed image of the reference layer and a reconstructed image of the current layer.

The reconstructed block or picture may be provided to each of the filter units 260 and 261. Each of the filter units 260 and 261 may include a deblocking filter and an offset correcting unit.

Information on whether a deblocking filter is applied to a corresponding block or picture and information on whether a strong filter or a weak filter is applied, when the deblocking filter is applied, may be received from the encoding device. The deblocking filter of the decoding device may receive deblocking filter-related information provided from the encoding device and the decoding device may perform deblocking filtering on a corresponding block.

The offset correction unit may perform offset correction on a reconstructed image based on the type of the offset correction and offset value information applied to an image at the time of coding.

Each of the memories 270 and 271 may store the reconstructed picture or block to allow them to be used as the reference picture or the reference block and may also output the reconstructed picture.

The encoding device and decoding device may perform encoding on three layers or more, not on two layers, and in this case, the coding unit and the decoding unit for the upper layer may be provided in plural numbers in correspondence to the number of upper layers.

In scalable video coding (SVC) for supporting a multi-layer structure, there is association between layers. When prediction is performed by using this association, data duplication elements may be removed and image coding performance may be improved.

Accordingly, when a picture (i.e. an image) of a current layer (i.e. an enhancement layer) to be encoded/decoded is predicted, inter-layer prediction by using information of another layer may be performed as well as inter prediction or intra-prediction using information of the current layer.

When the inter layer prediction is performed, prediction samples for the current layer may be generated by using a decoded picture of a reference layer, which is used for inter-layer prediction, as a reference picture.

In this case, since at least one of the spatial resolution, temporal resolution, and image quality may differ between the current layer and the reference layer (due to the difference in scalability between the layers), the decoded picture of the reference layer is resampled to be adapted to the scalability of the current layer, and may then be used as the reference picture for the inter-layer prediction of the current layer. "Resampling" means up-sampling or down-sampling the samples of the reference layer picture to match the picture size of the current layer picture.

In this specification, the current layer is the layer on which encoding or decoding is performed, and may be an enhancement layer or an upper layer. The reference layer is the layer that is referred to for inter-layer prediction of the current layer, and may be a base layer or a lower layer. The picture of the reference layer (that is, the reference picture) used for inter-layer prediction of the current layer may be called an inter-layer reference picture or a reference picture between layers.

Figure 3:
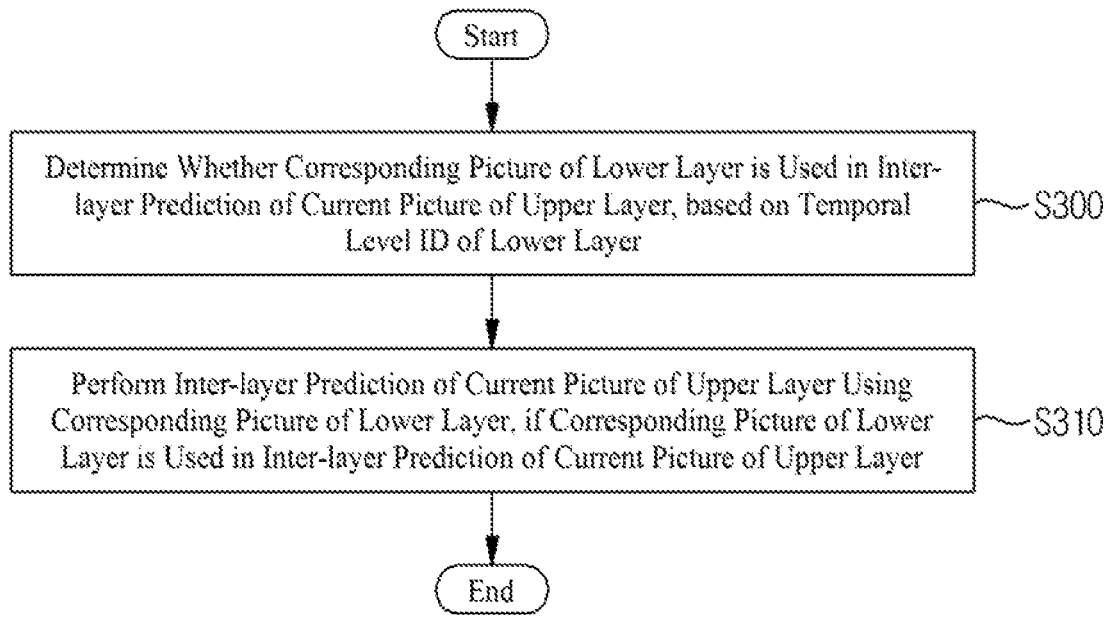
FIG. 3 is a flowchart illustrating an operation for performing inter-layer prediction for an upper layer using a corresponding picture of a lower layer in an embodiment to which the present invention is applied.

FIG. 3 is a flowchart illustrating an operation for performing inter-layer prediction of an upper layer using a corresponding picture of a lower layer in an embodiment to which the present invention is applied.

Referring to FIG. 3, it may be determined whether a corresponding picture of a lower layer is used in inter-layer prediction of a current picture of an upper layer, based on a temporal level ID, TemporalID of the lower layer (S300).

For example, if a current picture to be encoded in an enhancement layer has a low temporal resolution (i.e., the temporal level ID, TemporalID of the current picture has a small value), the difference between the display orders of the current picture and another already decoded picture of the enhancement layer is wide. In this case, since the image characteristics of the current picture and the already decoded picture are highly likely to be different, an up-sampled picture of the lower layer, instead of the already decoded picture of the enhancement layer, is highly likely to be used as a reference picture for the current picture.

On the other hand, if the current picture to be encoded in the enhancement layer has a high temporal resolution (i.e., the temporal level ID, TemporalID of the current picture has a large value), the difference between the display orders of the current picture and another already decoded picture of the enhancement layer is not great. In this case, since the image characteristics of the current picture and the already decoded picture are highly likely to be same, the already decoded picture of the enhancement layer is highly likely to be used as a reference picture for the current picture.

Since when the current picture has a low temporal resolution, the inter-layer prediction method is effective, it is necessary to determine whether to allow inter-layer prediction. For this purpose, a maximum temporal level ID of a lower layer for which inter-layer prediction is allowed may be signaled, which will be described in detail with reference to FIG. 4.

Meanwhile, the corresponding picture of the lower layer may refer to a picture located at the same time instant as the current picture of the upper layer. For example, the corresponding picture may be a picture having the same Picture Order Count (POD) information as the current picture of the upper layer. The corresponding picture may be included in the same Access Unit (AU) as the current picture of the upper layer.

Also, a video sequence may include a plurality of layers encoded scalably according to a temporal/spatial resolution or a quantization size. A temporal level ID may be an ID identifying each of a plurality of layers encoded scalably according to a temporal resolution.

If it is determined that the corresponding picture of the lower layer is used in inter-layer prediction of the current picture of the upper layer in step S300, inter-layer prediction of the current picture may be performed using the corresponding picture of the lower layer (S310).

Specifically, inter-layer prediction may be performed in parallel on a tile basis of multiple layers through tile alignment between the upper layer and the lower layer, which will be described with reference to FIGS. 7 to 11.

Or inter-layer prediction of the current picture of the upper layer may be performed restrictively depending on tile alignment or tile misalignment between the multiple layers, which will be described with reference to FIGS. 12 to 15.

Meanwhile, if the current picture of the upper layer and the corresponding picture of the lower layer have different spatial resolutions, the corresponding picture of the lower layer may be up-sampled and used as an inter-layer reference picture for the current picture. A method for up-sampling a corresponding picture of a lower layer will be described with reference to FIG. 16.

Figures 4, 5:
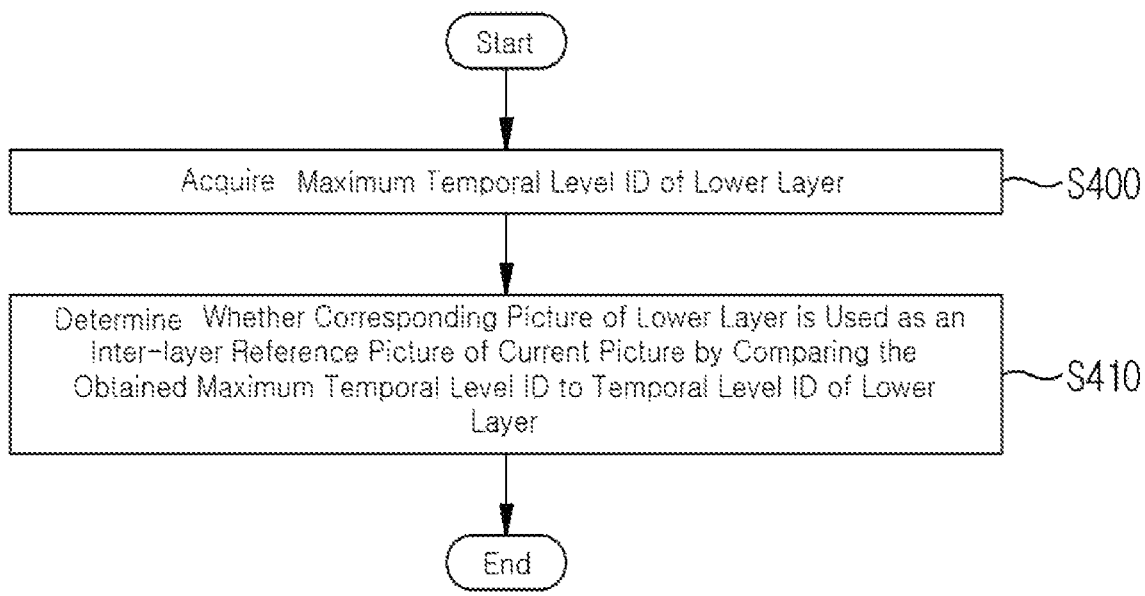
FIG. 4 is a flowchart illustrating an operation for determining whether a corresponding picture of a lower layer is used as an inter-layer reference picture for a current picture in an embodiment to which the present invention is applied.
FIG. 5 is a flowchart illustrating a method for acquiring a maximum temporal level identifier (ID) by extracting the maximum temporal level ID from a bit stream in an embodiment to which the present invention is applied.

FIG. 4 is a flowchart illustrating an operation for determining whether a corresponding picture of a lower layer is used as an inter-layer reference picture for a current picture in an embodiment to which the present invention is applied.

Referring to FIG. 4, a maximum temporal level identifier relating to a lower layer is able to be obtained S400.

Here, a maximum temporal level identifier means a maximum value of a temporal level identifier of a lower layer to which an inter-layer prediction of an upper layer is allowed.

A maximum temporal level identifier is able to be derived by a maximum temporal level indicator which is extracted by a bitstream and is described in detail in FIG. 5. Or, the maximum temporal level identifier is able to be derived based on a pre-defined default temporal level value. For example, a pre-defined default temporal level value may mean a maximum value in a pre-determined range in which a maximum temporal level indicator is included. If a pre-determined range relating to a value of the maximum temporal level indicator is 0 to 7, the pre-defined default temporal level value is able to be derived to 7. This can be applied when a maximum temporal level indicator is not signaled for each layer since maximum temporal level indicators of all layers in the video sequence are equal to each other.

Whether a corresponding picture of a lower layer being used as a reference picture of a current picture, is determined by comparing a maximum temporal level identifier obtained at S400 to a temporal level identifier of a lower level S410.

For example, if a temporal level indicator of a lower level is greater than the maximum temporal level indicator, a corresponding picture of the lower layer is not used as an inter-layer reference picture for a current picture.

On the other hands, a temporal level identifier of a lower layer is less than or equal to the maximum temporal level identifier, corresponding picture of the lower layer is able to be used as an inter-layer reference picture for a current picture. Namely, an inter-layer prediction of a current picture may be performed using a picture of a lower layer whose a temporal level indicator is less than the maximum temporal level indicator.

FIG. 5 is a flowchart illustrating a method for acquiring a maximum temporal level identifier (ID) by extracting the maximum temporal level ID from a bit stream in an embodiment to which the present invention is applied.

An encoder determines an optimal maximum temporal level identifier, decodes it and transmits it to a decoder. At this time, an encoder is able to encode a determined maximum temporal level identifier as it is or encode a value (max_tid_il_ref_pics_plus1, hereinafter called 'maximum temporal level indicator') calculated by adding 1 to a determined maximum temporal level identifier.

Referring to FIG. 5, a maximum temporal level indicator relating to a lower layer is able to be obtained by a bitstream S500.

Here, a maximum temporal level indicator is able to be obtained as much as a number of maximum layers allowed in one video sequence. A maximum temporal level indicator is able to be obtained a video parameter set of a bitstream.

Concretely, if a value of an obtained maximum temporal level indicator is 0, it means that a corresponding picture of a lower layer is not used as an inter-layer reference picture for an upper layer. Here, a corresponding picture of a lower layer may be a picture (non-Random Access Picture) other than a random-access picture.

For example, if a maximum temporal level indicator is 0, a picture of an $i^{th}$ layer among a plurality of layers in a video sequence is not used to a reference picture for an inter-layer prediction of a picture included in an $(i+1)^{th}$ layer.

On the other hands, if a maximum temporal level indicator is greater than 0, it means that a corresponding picture, which has a temporal level identifier greater than a maximum temporal level identifier, of a lower layer is not used as an inter-layer reference picture for an upper layer.

For example, if a maximum temporal level indicator is greater than 0, a picture, which has a temporal level identifier greater than a maximum temporal level identifier, of an $i^{th}$ layer among a plurality of layers in a video sequence is not used to a reference picture for an inter-prediction of a picture included in an $(i+1)^{th}$ layer. Namely, if a maximum temporal level indicator is greater than 0, and a picture included in an $i^{th}$ layer among a plurality of layers in a video sequence has a temporal level identifier less than a maximum temporal level identifier, a picture included in an $i^{th}$ layer is used to a reference picture for an inter-layer prediction of a picture included in an $(i+1)^{th}$ layer. Here, a maximum temporal level identifier is derived from a maximum temporal level indicator. For instance, a maximum temporal level identifier is derived to a value subtracting 1 from a maximum temporal level identifier.

Meanwhile, a maximum temporal level indicator derived at S500 has a value in a pre-determined range (e.g., 0 to 7). If a value of a maximum temporal level indicator derived at S500 corresponds to a maximum value in the pre-determined range, a corresponding picture of a lower layer is able to be used as an inter-layer reference picture for an upper layer regardless of a temporal level identifier (TemporalID) of a corresponding picture of a lower layer.

FIG. 6 illustrates a relationship between slices and tiles in an embodiment to which the present invention is applied.

One picture may be divided into at least one slice. A slice may be a basic unit which may be subjected to entropy decoding independently. One slice may include a plurality of slice segments.

Further, one picture may be divided into at least one tile. A tile is a square area including a plurality of coding tree units, and entropy decoding may be performed on a tile basis. Further, a plurality of tiles may be decoded simultaneously, that is, in parallel. An encoder may encode an optimum tile size or tile unit and transmit the encoded tile size or tile unit to a decoder.

Or inter-layer tile alignment may be performed. That is, the tile size or tile unit of the upper layer may be induced based on the tile size or tile unit of the lower layer.

FIG. 6(a) illustrates a case in which one picture is divided into one independent slice segment and four dependent slice segments. An independent slice segment refers to a slice segment including a slice segment header, whereas a dependent slice segment refers to a slice segment without a slice segment header, sharing the header of an independent slice segment. Also, a slice segment includes a plurality of coding tree units, each coding tree unit having a size equal to a maximum size of a coding unit which is a basic unit for video signal processing.

Referring to FIG. 6(a), one tile may include a plurality of slice segments, and one slice segment may exist in one tile. Or a plurality of tiles may exist in one slice.

FIG. 6(b) illustrates a case in which one tile includes two or more slices. That is, referring to FIG. 6(b), slice 0 may include independent slice segment 0 and dependent slice segment 1, and slice 1 may include independent slice segment 1 and dependent slice segment 2. Slice 0 and slice 1 may be included in one tile, tile 0.

Figure 7:
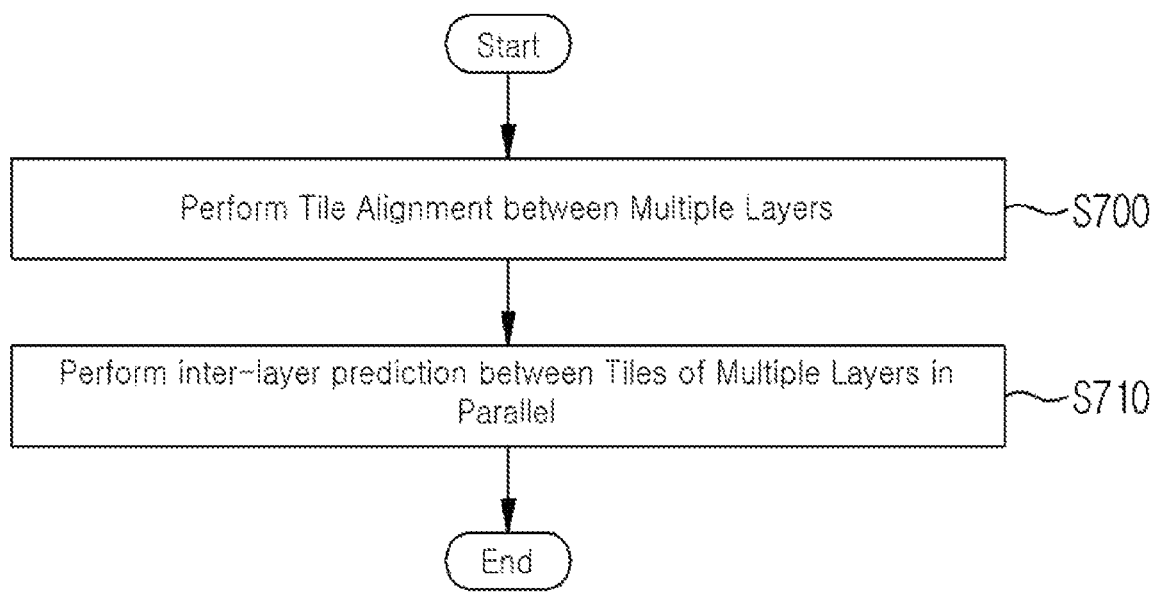
FIG. 7 is a flowchart illustrating a method for performing inter-layer prediction using tile alignment between multiple layers in an embodiment to which the present invention is applied.

FIG. 7 is a flowchart illustrating a method for performing inter-layer prediction using tile alignment between multiple layers in an embodiment to which the present invention is applied.

Referring to FIG. 7, tile alignment between multiple layers may be performed (S700).

Tile alignment between multiple layers may mean that the tile size or tile unit of an upper layer is induced based on the tile size or tile unit of a lower layer. For example, the tile size or tile unit of the upper layer may be set to the same tile size or tile unit as the lower layer. Or when the upper layer is encoded, the tile size or tile unit of the upper layer is induced using information about the tile size or tile unit of the lower layer.

A method for aligning tile sizes or tile units between an upper layer and a lower layer will be described with reference to FIGS. 8 to 11.

Referring to FIG. 7, inter-layer prediction may be performed on tiles of multiple layers in parallel (S710).

Specifically, if the tile size or tile unit of an upper layer is aligned based on the tile size or tile unit of the lower layer, one tile of the lower layer may be decoded and then one tile of the upper layer may be decoded. After a next tile of the lower layer is decoded, a next tile of the upper layer may be decoded. As the tile sizes or tile units are aligned between the upper layer and the lower layer in this manner, inter-layer prediction between the upper layer and the lower layer may be performed in parallel.

On the other hand, if a different tile size or tile unit is set on a multi-layer basis, the upper layer may be decoded after the lower layer is completely decoded.

Figure 8:
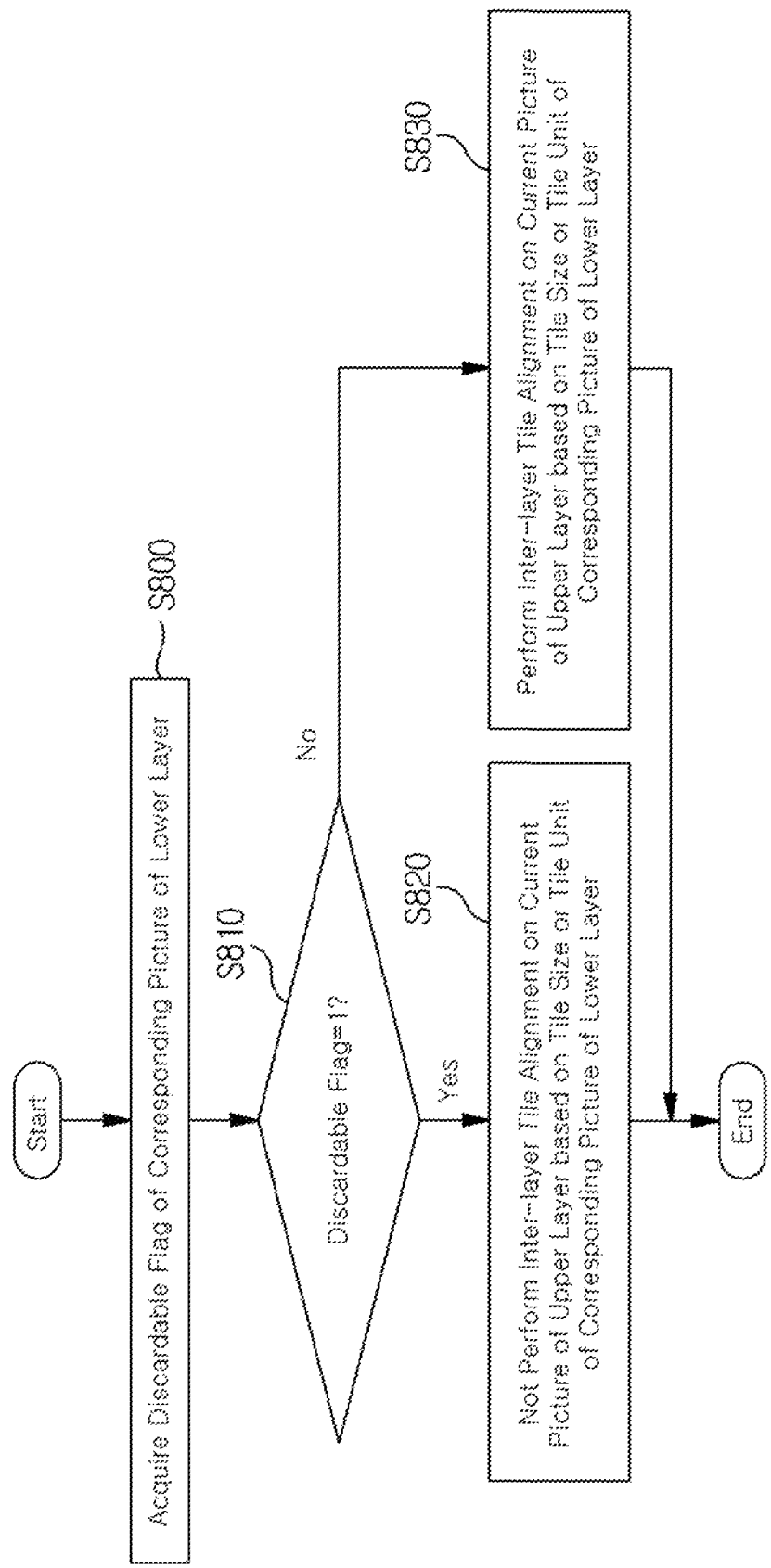
FIG. 8 is a flowchart illustrating a method for adaptively performing inter-layer tile alignment based on a discardable flag in an embodiment to which the present invention is applied.

FIG. 8 is a flowchart illustrating a method for adaptively performing inter-layer tile alignment based on a discardable flag in an embodiment to which the present invention is applied.

Referring to FIG. 8, a discardable flag of a corresponding picture of a lower layer may be acquired (S800).

The discardable flag may mean information indicating whether a coded picture is used as a reference picture or an inter-layer reference picture during decoding of a following picture according to a decoding order. That is, if the discardable flag is 1, this means that a coded picture is not used as a reference picture or an inter-layer reference picture during decoding of a following picture according to a decoding order. In this case, the coded picture may be marked as unused for reference, indicating that it is not used as a reference picture, in order to efficiently manage a Decoded Picture Buffer (DPB). On the contrary, if the discardable flag is 0, this means that a coded picture is used as a reference picture or an inter-layer reference picture during decoding of a following picture according to a decoding order.

Meanwhile, the discardable flag is not limited to acquisition on a picture basis. Obviously, the discardable flag may be acquired on a slice basis or on a slice segment basis.

The value of the discardable flag acquired in step S800 may be checked (S810).

If the discardable flag is 1, inter-layer tile alignment may not be performed on a current picture of the upper layer based on the tile size or tile unit of a corresponding picture of the lower layer (S820).

On the contrary, if the discardable flag is 0, inter-layer tile alignment may be performed on the current picture of the upper layer based on the tile size or tile unit of the corresponding picture of the lower layer (S830).

Figure 9:
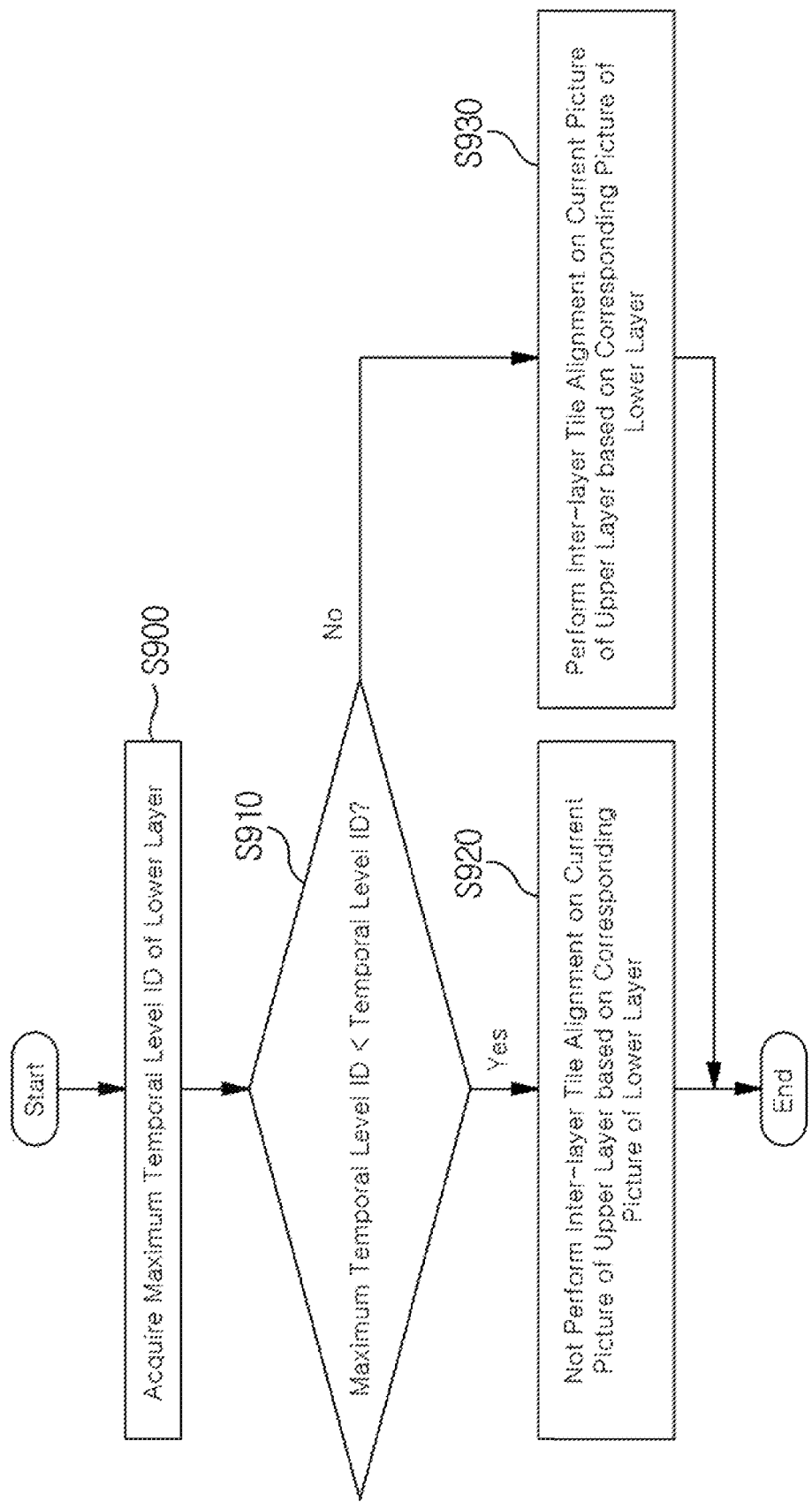
FIGS. 9, 10, and 11 are flowcharts illustrating methods for adaptively performing inter-layer tile alignment based on a temporal level ID, TemporalID of a lower layer in an embodiment to which the present invention is applied.
Figure 10:
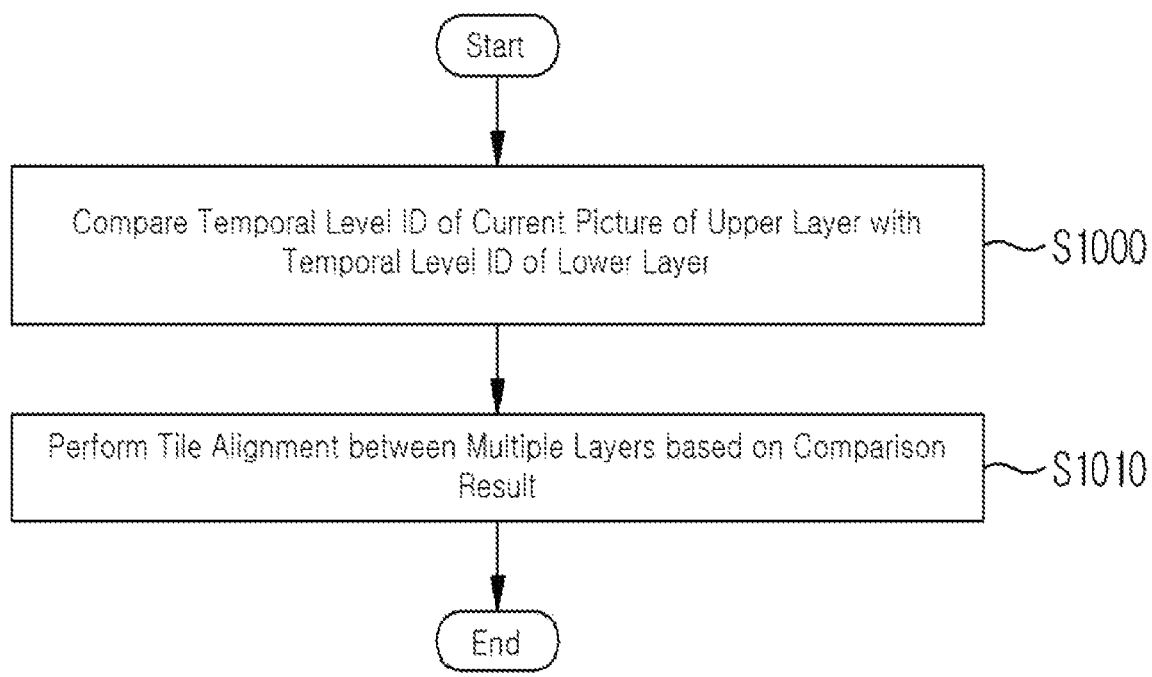
Figure 11:
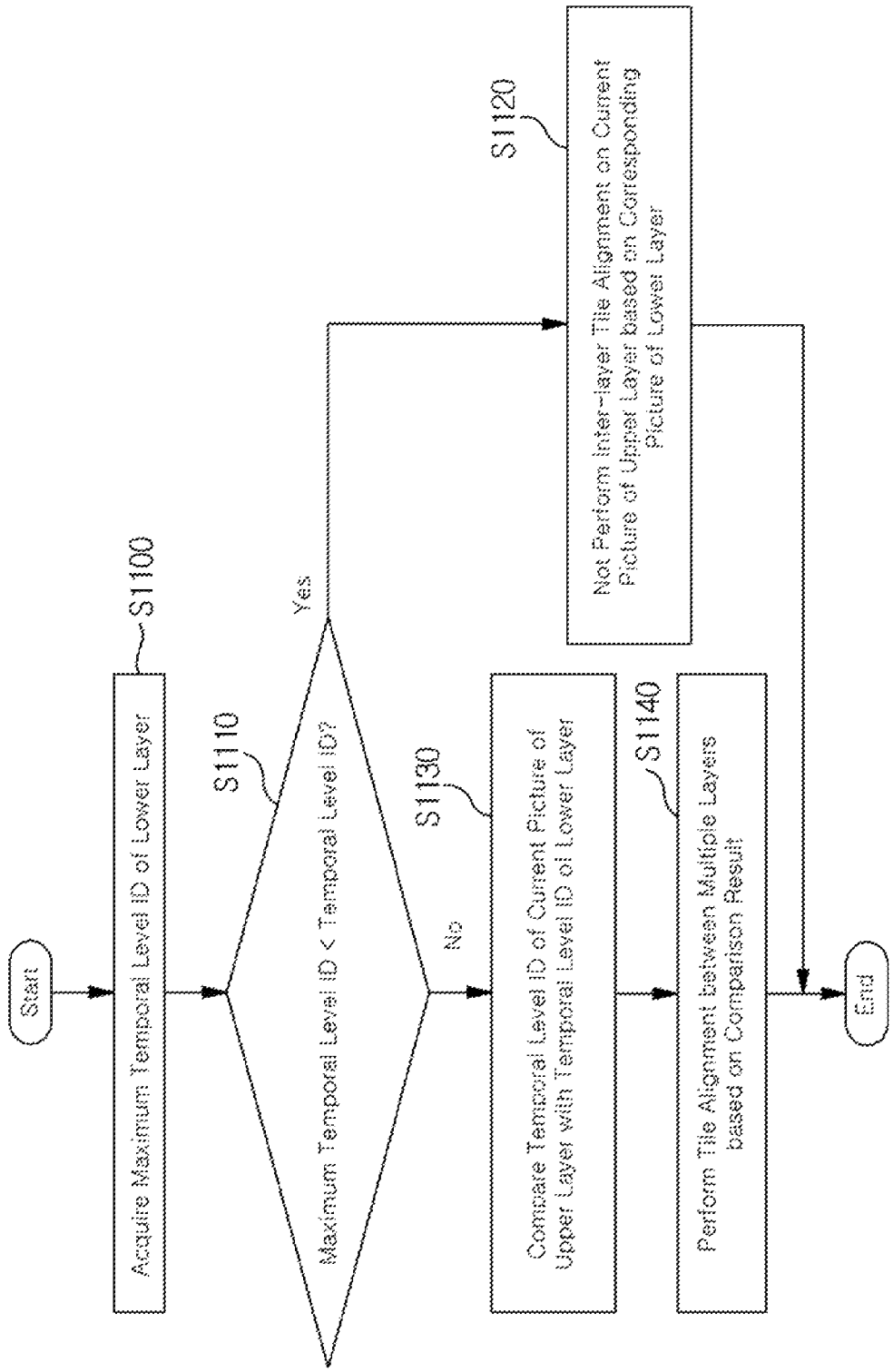

FIGS. 9, 10, and 11 are flowcharts illustrating methods for adaptively performing inter-layer tile alignment based on a temporal level ID, TemporalID of a lower layer in an embodiment to which the present invention is applied.

Since the efficiency of inter-layer prediction varies according to a temporal level ID in a multi-layer structure, inter-layer tile alignment may be performed adaptively according to the temporal level ID of a picture belonging to a specific layer.

(1) Use of Maximum Temporal Level ID of Lower Layer

Referring to FIG. 9, a maximum temporal level ID of a lower layer may be acquired (S900). A method for acquiring a maximum temporal level ID has been described before with reference to FIG. 5 and thus will not be described in detail herein.

The maximum temporal level ID acquired in step S900 may be compared with the temporal level ID of a corresponding picture of the lower layer (S910).

If the temporal level ID of the corresponding picture of the lower layer is larger than the maximum temporal level ID of the lower layer in step S910, the corresponding picture of the lower layer may not be used as an inter-layer reference picture for a current picture of an upper layer. Therefore, inter-layer tile alignment may not be performed on the current picture of the upper layer based on the corresponding picture of the lower layer (S920).

On the contrary, if the temporal level ID of the corresponding picture of the lower layer is equal to or less than the maximum temporal level ID of the lower layer in step S910, the corresponding picture of the lower layer may be used as an inter-layer reference picture for the current picture of the upper layer. Therefore, inter-layer tile alignment may be performed on the current picture of the upper layer based on the corresponding picture of the lower layer (S930).

(2) Use of Temporal Level ID of Upper Layer

Referring to FIG. 10, the temporal level ID of a current picture of an upper layer may be compared with the temporal level ID of a corresponding picture of a lower layer (S1000).

Specifically, it may be determined whether the temporal level ID of the current picture of the upper layer and the temporal level ID of the corresponding picture of the lower layer have the same value or different values. If the current picture of the upper layer and the corresponding picture of the lower layer have different temporal level IDs, it may be inefficient to perform inter-layer prediction or inter-layer tile alignment.

Tile alignment between multiple layers may be performed based on a result of the comparison of step S1000 (S1010).

Specifically, if the current picture of the upper layer and the corresponding picture of the lower layer have different temporal level IDs, inter-layer tile alignment may not be performed. On the other hand, if the current picture of the upper layer and the corresponding picture of the lower layer have the same temporal level ID, inter-layer tile alignment may be performed.

(3) Use of Maximum Temporal Level ID of Lower Layer and Temporal Level ID of Upper Layer Inter-layer tile alignment may be performed adaptively in the above-described methods (1) and (2) combined.

Referring to FIG. 11, a maximum temporal level ID of a lower layer may be acquired (S1100).

The maximum temporal level ID acquired in step S1100 may be compared with the temporal level ID of a corresponding picture of the lower layer (S1110).

If the temporal level ID of the corresponding picture of the lower layer is larger than the maximum temporal level ID of the lower layer in step S1110, the corresponding picture of the lower layer may not be used as an inter-layer reference picture for a current picture of an upper layer. Therefore, inter-layer tile alignment may not be performed on the current picture of the upper layer based on the corresponding picture of the lower layer (S1120).

On the contrary, if the temporal level ID of the corresponding picture of the lower layer is equal to or less than the maximum temporal level ID of the lower layer in step S1110, the temporal level ID of a current picture of an upper layer may be compared with the temporal level ID of the corresponding picture of the lower layer (S1130).

Tile alignment between multiple layers may be performed based on a result of the comparison of step S1130 (S1140).

That is, if the current picture of the upper layer and the corresponding picture of the lower layer have different temporal level IDs, inter-layer tile alignment may not be performed. On the other hand, if the current picture of the upper layer and the corresponding picture of the lower layer have the same temporal level ID, inter-layer tile alignment may be performed.

Meantime, while the temporal level IDs of the upper layer and the lower layer are compared after the maximum temporal level ID of the lower layer is compared with the temporal level ID of the corresponding picture of the lower layer in FIG. 11, the comparison order is not limited. It is obvious that after the temporal level IDs of the upper layer and the lower layer are compared, the maximum temporal level ID of the lower layer may be compared with the temporal level ID of the corresponding picture of the lower layer.

Figure 12:
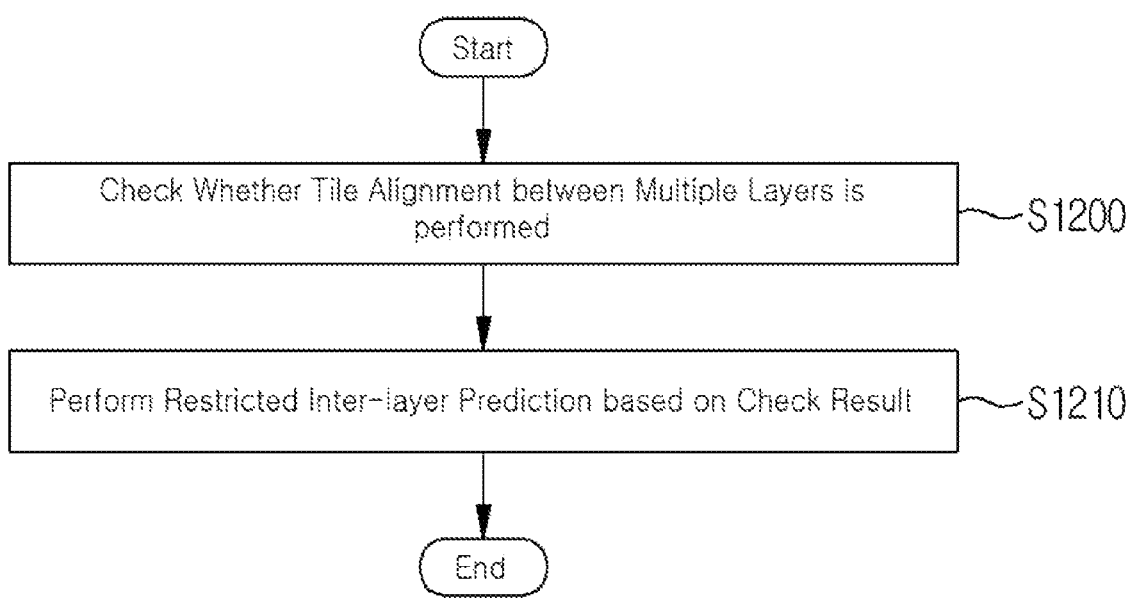
FIG. 12 is a flowchart illustrating a method for performing restricted inter-layer prediction depending on inter-layer tile alignment or misalignment in an embodiment to which the present invention is applied.

FIG. 12 is a flowchart illustrating a method for performing restricted inter-layer prediction depending on inter-layer tile alignment or misalignment in an embodiment to which the present invention is applied.

Referring to FIG. 12, it may be determined whether tiles have been aligned between an upper layer and a lower layer (S1200).

For example, it may be determined whether tiles have been aligned between the upper layer and the lower layer based on a tile boundary alignment flag, tile_boundaries_aligned_flag[i][j].

Specifically, if the value of the tile boundary alignment flag, tile_boundaries_aligned_flag[i][j] is 1, this implies that if two samples of a current picture belonging to an $i^{th}$ layer (i.e., the upper layer) belong to one tile, two samples of a corresponding picture belonging to a $j^{th}$ layer (i.e., the lower layer) belong to one tile, and if the two samples of the current picture belonging to the $i^{th}$ layer (i.e., the upper layer) belong to different tiles from each other, the two samples of the corresponding picture belonging to the $j^{th}$ layer (i.e., the lower layer) belong to different tiles from each other.

Therefore, if the value of the tile boundary alignment flag, tile_boundaries_aligned_flag[i][j] is 1, this may imply that tile sizes or tile units are aligned between the current picture of the upper layer and the corresponding picture of the lower layer. On the contrary, if the tile boundary alignment flag, tile_boundaries_aligned_flag[i][j] is 0, this may imply that tiles are not aligned between the layers.

The $j^{th}$ layer may be a layer having direct dependency on the $i^{th}$ layer. It may be determined whether a layer has direct dependency on the upper layer based on a direct dependency flag direct_dependency_flag[i][j]. The direct dependency flag direct_dependency_flag[i][j] may indicate whether the $j^{th}$ layer is used in inter-layer prediction of the $i^{th}$ layer.

For example, if the value of the direct dependency flag direct_dependency_flag[i][j] is 1, the $j^{th}$ layer may be used in inter-layer prediction of the $i^{th}$ layer, and if the value of the direct dependency flag direct_dependency_flag[i] [j] is 0, the $j^{th}$ layer may not be used in inter-layer prediction of the $i^{th}$ layer.

Meanwhile, a temporal level identifier of a corresponding picture included in the $j^{th}$ layer may be equal to or less than a maximum temporal level identifier relating to the $j^{th}$ layer. This matter has been reviewed via FIG. 4 and FIG. 5, so details regarding this matter are omitted. Or, a corresponding picture included in a $j^{th}$ layer may have a same temporal level identifier with a current picture included in an $i^{th}$ layer.

Also, two samples of the corresponding picture belonging to the $j^{th}$ layer may refer to samples at the same positions as two samples of the current picture.

The tile boundary alignment flag, tile_boundaries_aligned_flag[i][j] may be acquired from Video Usability Information (VUI) in a video parameter set. The VUI may refer to information used for decoder conformance or output timing conformance.

Meanwhile, in the presence of information about the tile size or tile unit of at least one picture belonging to each of the upper layer (i.e., the $j^{th}$ layer) and the lower layer (i.e., the $i^{th}$ layer), the tile boundary alignment flag, tile_boundaries_aligned_flag[i][j] may be acquired. A method for acquiring a tile boundary alignment flag will be described with reference to FIGS. 13, 14, and 15.

Referring to FIG. 12, restricted inter-layer prediction may be performed based on a result of the determination of step S1200 (S1210).

It may be restricted that a sample in a specific area of the corresponding picture of the lower layer is not used for inter-layer prediction of the current picture of the upper layer according to the tile boundary alignment flag of the current picture of the upper layer.

Specifically, if the value of the tile boundary alignment flag of the current picture is 1, it may be restricted that a sample outside a tile of the corresponding picture is not used for inter-layer prediction of a sample inside of the current picture. That is, if the value of the tile boundary alignment flag of the current picture is 1, inter-layer prediction may be performed on a sample inside a tile of the current picture, only using a sample inside a tile of the corresponding picture.

On the contrary, if the value of the tile boundary alignment flag of the current picture is 0, the constraint that a sample outside a tile of the corresponding picture is not used for inter-layer prediction of a sample inside of the current picture may not be applied. That is, if the value of the tile boundary alignment flag of the current picture is 0, inter-layer prediction may be performed on a sample inside a tile of the current picture, using a sample inside and/or outside a tile of the corresponding picture.

A tile of the current picture may refer to a tile matching a tile of the corresponding picture through inter-layer tile alignment. Also, each of the tiles of the current picture and the corresponding picture may be one tile or a set of a plurality of tiles.

FIGS. 13, 14, and 15 illustrate syntaxes of a tile boundary alignment flag in an embodiment to which the present invention is applied.

Referring to FIG. 13, the tile boundary alignment flag, tile_boundaries_aligned_flag[i][j] may be acquired (S1300).

As described before, the tile boundary alignment flag, tile_boundaries_aligned_flag[i][j] may indicate whether the tile size or tile unit of an $i^{th}$ layer is aligned with the tile size or tile unit of a $j^{th}$ layer. Herein, the $j^{th}$ layer is a layer having direct dependency on the $i^{th}$ layer among a plurality of layers included in a video sequence. That is, the $j^{th}$ layer refers to a layer used for inter-layer prediction of the $i^{th}$ layer. Accordingly, as many tile boundary alignment flags, tile_boundaries_aligned_flag[i][j] as the number NumDirectRefLayers_id_in_nuh[i] of layers having direct dependency on the $i^{th}$ layer may be acquired.

Meanwhile, inter-layer tile alignment may not be used for any of the layers included in the video sequence. For this purpose, a non-tile alignment flag, tile_boundaries_non_aligned_flag may be signaled.

Referring to FIG. 14, the non-tile alignment flag, tile_boundaries_non_aligned_flag may be acquired (S1400).

The non-tile alignment flag, tile_boundaries_non_aligned_flag may indicate whether inter-layer alignment is restricted in a layer of a video sequence.

Specifically, if the non-tile alignment flag, tile_boundaries_non_aligned_flag is 1, a constraint that inter-layer tile alignment is not performed on a layer of the video sequence is applied.

For example, if a picture belonging to a layer of the video sequence does not use a tile, inter-layer tile alignment may not be performed. When a picture of the video sequence does not use a tile, the non-tile alignment flag, tile_boundaries_non_aligned_flag is encoded to be 1. When the non-tile alignment flag, tile_boundaries_non_aligned_flag is 1, this means that a picture of the video sequence does not use a tile and the constraint that inter-layer tile alignment is not performed may be applied.

On the contrary, if the non-tile alignment flag, tile_boundaries_non_aligned_flag is 0, this means that the constraint that inter-layer tile alignment is not performed in a layer of the video sequence is not applied. For example, if the non-tile alignment flag, tile_boundaries_non_aligned_flag is 0, this means that a picture belonging to the layer of the video sequence uses a tile. Also, if the non-tile alignment flag, tile_boundaries_non_aligned_flag is 0, this means that inter-layer tile alignment may be performed in at least one of the layers of the video sequence.

Therefore, the non-tile alignment flag, tile_boundaries_non_aligned_flag may indicate whether the tile boundary alignment flag is present or the tile boundary alignment flag is extracted from a bit stream.

Referring to FIG. 14, only when the non-tile alignment flag, tile_boundaries_non_aligned_flag is 0, the tile boundary alignment flag, tile_boundaries_aligned_flag[i][j] may be acquired restrictively (S1410).

That is, if the non-tile alignment flag, tile_boundaries_non_aligned_flag is 1, inter-layer tile alignment is not performed in any of the layers of the video sequence. Thus, there is no need for signaling the tile boundary alignment flag, tile_boundaries_aligned_flag[i][j] indicating whether tile alignment is applied, on a layer basis.

As described before with reference to FIG. 13, the tile boundary alignment flag, tile_boundaries_aligned_flag[i][j] may indicate whether the tile size or tile unit of an $i^{th}$ layer is aligned with the tile size or unit of a $j^{th}$ layer. Herein, the $j^{th}$ layer is a layer having direct dependency on the $i^{th}$ layer among a plurality of layers included in a video sequence. That is, the $j^{th}$ layer refers to a layer used for inter-layer prediction of the $i^{th}$ layer. Accordingly, as many tile boundary alignment flags, tile_boundaries_aligned_flag[i][j] as the number NumDirectRefLayers_id_in_nuh[i] of layers having direct dependency on the $i^{th}$ layer may be acquired.

Meanwhile, it may occur that inter-layer tile alignment is used in all other layers except for a layer (e.g., a layer encoded by a H.264/AVC or HEVC codec) in which inter-layer prediction is not performed, in a video sequence. In this case, a tile alignment present flag (tile_boundaries_aligned_present_flag) indicating whether the tile boundary of all other layers may be derived may be signaled.

Referring to FIG. 15, a tile alignment present flag(tile_boundaries_aligned_present_flag) may be acquired (S1500).

Here, the tile alignment present flag indicates whether a tile boundary is derived on all other layers in a video sequence except for a layer in which inter-layer prediction is not performed.

For example, when the tile alignment present flag is 1, the tile boundary is derived for all other layers in a video sequence except for a layer in which inter-layer prediction is not performed. When the tile alignment present flag is 0, the tile boundary is not derived for all other layers in a video sequence except for a layer in which inter-layer prediction is not performed.

Therefore, only when the tile alignment present flag is 0, the tile boundary alignment flag(tile_boundaries_aligned_flag[i][j]) may be acquired restrictively (S1510).

That is, if the tile alignment present flag is 1, this means that the tile boundary belonging to a picture or a slice is derived. Thus, there is no need for signaling the tile boundary alignment flag on a layer basis. On the contrary, if the tile alignment present flag is 0, the tile boundary belonging to a picture or a slice is not derived. Thus, there is need for signaling the tile boundary alignment flag indicating whether the tile alignment is applied, on a layer basis.

Specifically, whether the tile boundary belonging to a picture or a slice is derived may be determined based on the number of a tile belonging to the picture or the slice.

For example, if the number of a tile belonging to the picture of the video sequence is 1, this means that one tile belonging to the picture is the same as the picture. In other words, this also means the picture does not use a tile. In this case, the tile boundary may be derived to be equal to the picture boundary. Therefore, if the number of a tile belonging to the picture of the video sequence is 1, the tile alignment present flag may be encoded to be 1 and the tile boundary present flag may not be signaled on a layer basis. The tile boundary present flag may not be acquired when the number of a tile belonging to the picture of the video sequence is 1.

Whereas, if the number of a tile belonging to the picture of the video sequence is two or more, there is need for signaling the tile boundary alignment flag on a layer basis since the tile boundary is not derived. That is, the tile boundary alignment flag may be acquired when the number of a tile belonging to the picture of the video sequence is two or more. Here, the case that the number of a tile belonging to the picture of the video sequence is two or more 1 means that the picture uses a tile.

The tile boundary alignment flag(tile_boundaries_aligned_flag[i][j]) may indicate whether an $i^{th}$ layer is aligned with the tile size or tile unit of a $j^{th}$ layer. Herein, the $j^{th}$ layer is a layer having direct dependency on the $i^{th}$ layer, among a plurality of layers included in a video sequence. That is, the $j^{th}$ layer refers to a layer to be used for inter-layer prediction of the $i^{th}$ layer. Accordingly, as many tile boundary alignment flags as the number (NumDirectRefLayers_id_in_nuh [i]) of layers having direct dependency on the $i^{th}$ layer may be acquired.

Figure 16:
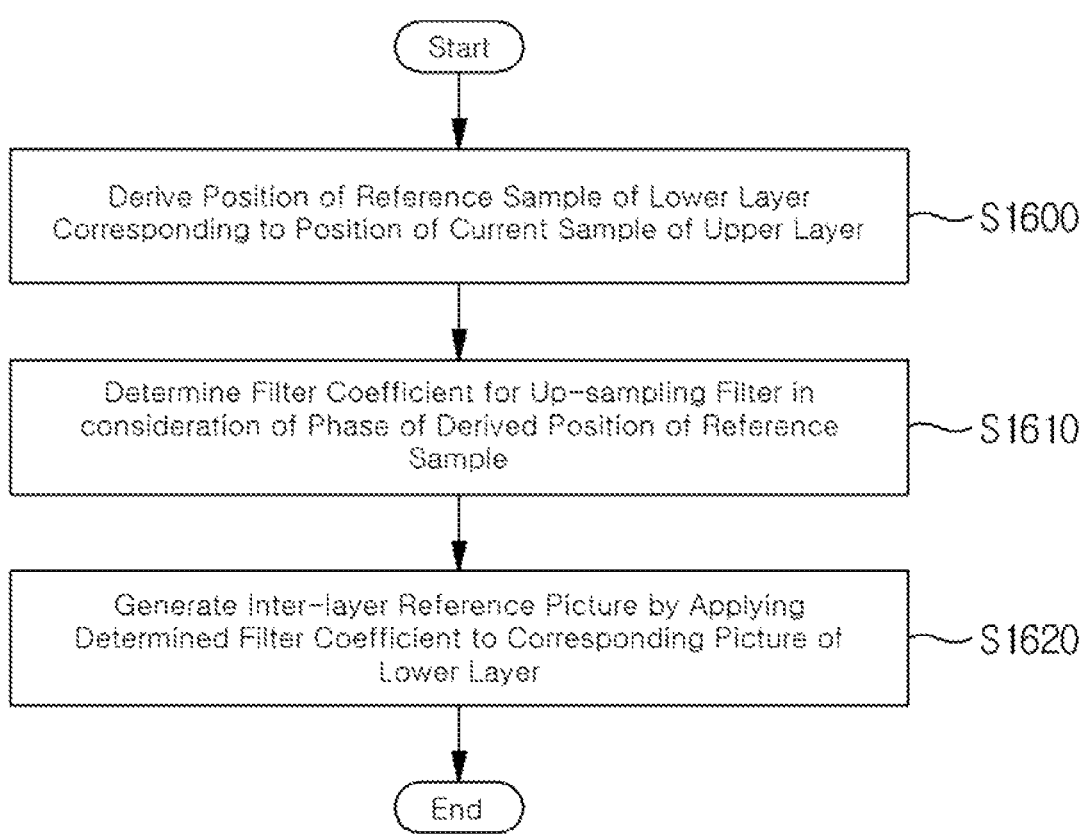
FIG. 16 is a flowchart illustrating a method for up-sampling a corresponding picture of a lower layer in an embodiment to which the present invention is applied.

FIG. 16 is a flowchart illustrating a method for up-sampling a corresponding picture of a lower layer in an embodiment to which the present invention is applied.

Referring to FIG. 16, the position of a reference sample of a lower layer corresponding to the position of a current sample of an upper layer may be derived (S1600).

Since the upper layer and the lower layer may have different resolutions, the position of the reference sample of the lower layer corresponding to the position of the current sample of the upper layer may be derived in consideration of the difference between the resolutions of the layers. That is, the width-height ratios of pictures of the upper layer and the lower layer may be taken into account. Also, the size of an up-sampled picture of the lower layer may not match the size of the picture of the upper layer, and thus an offset for correcting the size difference may be required.

For example, the position of the reference sample may be determined, taking into account a scale factor and an up-sampled lower layer offset.

The scale factor may be calculated based on the width-height ratios of the current picture of the upper layer and the corresponding picture of the lower layer.

The up-sampled lower layer offset may refer to information about the difference between the position of a sample at an edge of the current picture and the position of a sample at an edge of the inter-layer reference picture. For example, the up-sampled lower layer offset may include information about a horizontal/vertical-directional difference between the position of a sample at a top left end of the current picture and the position of a sample at a top left end of the corresponding picture, and information about a horizontal/vertical-directional difference between the position of a sample at a bottom right end of the current picture and the position of a sample at a bottom right end of the corresponding picture.

The up-sampled lower layer offset may be acquired from a bit stream. For example, the up-sampled lower layer offset may be acquired from at least one of a video parameter set, a sequence parameter set, a picture parameter set, or a slice header.

A filter coefficient of an up-sampling filter may be determined in consideration of the phase of the reference sample position determined in step S1600 (S1610).

Herein, either of a fixed up-sampling filter and an adaptive up-sampling filter may be used as the up-sampling filter.

1. Fixed Up-Sampling Filter

A fixed up-sampling filter may refer to an up-sampling filter having a predetermined filter coefficient, with no regard to the characteristics of a video. A tap filter may be used as the fixed up-sampling filter, and a fixed up-sampling filter may be defined for each of a luminance component and a chrominance component. With reference to [Table 1] and [Table 2], fixed up-sampling filters having an accuracy of a 1/16 sample unit will be described.

TABLE 1

| | Coefficients of interpolation filter | | | | | | | |
|---|---|---|---|---|---|---|---|---|
| Phase p | f[p, 0] | f[p, 1] | f[p, 2] | f[p, 3] | f[p, 4] | f[p, 5] | f[p, 6] | f[p, 7] |
| 0 | 0 | 0 | 0 | 64 | 0 | 0 | 0 | 0 |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −3 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

[Table 1] defines filter coefficients for a fixed up-sampling filter, for the luminance component.

As noted from [Table 1], an 8-tap filter is applied for up-sampling of the luminance component. That is, interpolation may be performed using a reference sample of a reference layer corresponding to a current sample of the upper layer and samples adjacent to the reference sample. The adjacent samples may be specified according to an interpolation direction. For example, if interpolation is performed in a horizontal direction, the adjacent samples may include three consecutive samples to the left of the reference sample and four consecutive samples to the right of the reference sample. Or if interpolation is performed in a vertical direction, the adjacent samples may include three consecutive samples above the reference sample and four consecutive samples under the reference sample.

Since interpolation is performed with an accuracy of a 1/16 sample unit, there are a total of 16 phases, for supporting resolutions of various magnifications such as 2 times, 1.5 times, etc.

Further, the fixed up-sampling filter may use a different filter coefficient for each phase p. Except for a case of a phase of 0 (p=0), the size of each filter coefficient may be defined to be within a range of 0 to 63. This means that filtering is performed with an accuracy of 6 bits. The phase of 0 means the positions of integer samples, the integer being a multiple of n, if interpolation is performed in units of a 1/n sample.

TABLE 2

| Phase p | Coefficients of interpolation filter | | | |
|---|---|---|---|---|
| | f[p, 0] | f[p, 1] | f[p, 2] | f[p, 3] |
| 0 | 0 | 64 | 0 | 0 |
| 1 | −2 | 62 | 4 | 0 |
| 2 | −2 | 58 | 10 | −2 |
| 3 | −4 | 56 | 14 | −2 |
| 4 | −4 | 54 | 16 | −2 |
| 5 | −6 | 52 | 20 | −2 |
| 6 | −6 | 46 | 28 | −4 |
| 7 | −4 | 42 | 30 | −4 |
| 8 | −4 | 36 | 36 | −4 |
| 9 | −4 | 30 | 42 | −4 |
| 10 | −4 | 28 | 46 | −6 |
| 11 | −2 | 20 | 52 | −6 |
| 12 | −2 | 16 | 54 | −4 |
| 13 | −2 | 14 | 56 | −4 |
| 14 | −2 | 10 | 58 | −2 |
| 15 | 0 | 4 | 62 | −2 |

[Table 2] defines filter coefficients for a fixed up-sampling filter, for the chrominance component.

As noted from [Table 2], a 4-tap filter is applied for up-sampling of the chrominance component, compared to the luminance component. That is, interpolation may be performed using a reference sample of a reference layer corresponding to a current sample of the upper layer and samples adjacent to the reference sample. The adjacent samples may be specified according to an interpolation direction. For example, if interpolation is performed in the horizontal direction, the adjacent samples may include one consecutive sample to the left of the reference sample and two consecutive samples to the right of the reference sample. Or if interpolation is performed in the vertical direction, the adjacent samples may include one consecutive sample above the reference sample and two consecutive samples under the reference sample.

Since interpolation is performed with an accuracy of a 1/16 sample unit as in the case of the luminance component, there are a total of 16 phases, and the fixed up-sampling filter may use a different filter coefficient for each phase p. Except for a case of a phase of 0 (p=0), the size of each filter coefficient may be defined to be within a range of 0 to 63. This means that filtering is performed with an accuracy of 6 bits.

While it has been described above that an 8-tap filter and a 4-tap filter are applied respectively to the luminance component and the chrominance component, the present invention is not limited thereto. Obviously, the order of a tap filter may be determined variably in consideration of coding efficiency.

2. Adaptive Up-Sampling Filter

An encoder may determine an optimum filter coefficient in consideration of the characteristics of a video without using a fixed filter coefficient, and signal the determined filter coefficient to a decoder. In this manner, an adaptive up-sampling filter uses a filter coefficient adaptively determined by the encoder. Since a video has a different characteristic on a picture basis, use of an adaptive up-sampling filter that represents well the characteristics of the video instead of using a fixed up-sampling filter for all cases may lead to improved coding efficiency.

An inter-layer reference picture may be generated by applying the filter coefficient determined in step S1610 to a corresponding picture of the lower layer (S1620).

Specifically, interpolation may be performed by applying the determined filter coefficient for the up-sampling filter to samples of the corresponding picture. Herein, the interpolation may be performed primarily in the horizontal direction and secondarily on samples generated from the horizontal interpolation in the vertical direction.

INDUSTRIAL APPLICABILITY

The present invention may be used in encoding/decoding a video signal of a multi-layer structure.

The invention claimed is:

1. A method for decoding a multi-layer video signal with a decoding apparatus, the method comprising:
obtaining, a maximum temporal level identifier relating to a lower layer, the maximum temporal level identifier indicating a maximum temporal level identifier to which an inter-layer prediction of an upper layer is allowed;
determining, whether a corresponding picture of the lower layer is used as an inter-layer reference picture for a current picture of the upper layer by comparing the obtained maximum temporal level identifier with a temporal level identifier of the corresponding picture of the lower layer; and
performing, the inter-layer prediction of the current picture using the corresponding picture of the lower layer,
wherein a tile alignment present flag is obtained from a bitstream when video usability information is presented in the bitstream, the tile alignment present flag equal to 1 indicates that a first restriction is applied and the tile alignment present flag equal to 0 indicates that the first restriction may or may not be applied,
wherein the first restriction is to restrict all pictures belonging to a video sequence to consist of a single tile,
wherein a layer tile enabled flag is obtained from the bitstream when the tile alignment present flag is equal to 0, the layer tile enabled flag equal to 1 indicates that a second restriction is applied and the layer tile enabled flag equal to 0 indicates that the second restriction may or may not be applied,
wherein the second restriction is to restrict all picture belonging to the upper layer to consist of a plurality of tiles;
wherein a tile boundary alignment flag is obtained, based on the layer tile enabled flag, from the bitstream, the tile boundary alignment flag indicates whether a third restriction is applied
wherein the third restriction is to restrict i) two samples of a corresponding picture of the lower layer to belong to one tile when two samples of the current picture of the upper layer belong to one tile, and ii) the two samples of the corresponding picture of the lower layer to belong to different tiles when the two samples of the current picture of the upper layer belong to different tiles, wherein a 8-tap filter is applied to the corresponding picture belonging to the lower layer for performing inter-layer prediction of luminance components of the current picture, and wherein coefficient sets of the 8-tap filter include {−1, 4, −10, 31, 47, −9, 3, −1}.

2. The method of claim 1, wherein when the corresponding picture is used for inter-layer prediction of a current block of the current picture, both x and y components of a motion vector relating to the current block are derived equal to zero.

3. The method of claim 1, wherein the maximum temporal level identifier is obtained based on a pre-defined default temporal level value, the pre-defined default temporal level value indicating a maximum value in a pre-determined range in which a maximum temporal level indicator is included.

4. A method for encoding a multi-layer video signal with an encoding apparatus, the method comprising:

encoding a tile alignment present flag indicating whether a first restriction is applied, wherein the first restriction is to restrict all pictures belonging to a video sequence to consist of a single tile;

encoding a layer tile enabled flag in response to a value of the tile alignment present flag, wherein the layer tile enabled flag indicates whether a second restriction is applied and the second restriction is to restrict all picture belonging to an upper layer to consist of a plurality of tiles;

encoding, based on the layer tile enabled flag, a tile boundary alignment flag indicating whether a third restriction is applied, wherein the third restriction is to restrict i) two samples of a corresponding picture of the lower layer to belong to one tile when two samples of the current picture of the upper layer belong to one tile, and ii) the two samples of the corresponding picture of the lower layer to belong to different tiles when the two samples of the current picture of the upper layer belong to different tiles; and generating a bitstream including at least one of the tile alignment present flag, the layer tile enabled flag and the tile boundary alignment flag, wherein the corresponding picture of the lower layer is a picture to which a re-sampling filter is applied for performing inter-layer prediction on the current picture, wherein a 8-tap filter is applied to the corresponding picture belonging to the lower layer for performing inter-layer prediction of luminance components of the current picture, and wherein coefficient sets of the 8-tap filter include {−1, 4, −10, 31, 47, −9, 3, −1}.

* * * * *